United States Patent [19]

Kojima et al.

[11] Patent Number: 5,224,643
[45] Date of Patent: Jul. 6, 1993

[54] TAPE GUIDE SYSTEM WITH TEMPERATURE COMPENSATION FOR DRIVE SIGNAL

[75] Inventors: Toshiaki Kojima; Kazuyuki Sugizaki, both of Kanagawa, Japan

[73] Assignee: Sony Corporation, Tokyo, Japan

[21] Appl. No.: 856,174

[22] Filed: Mar. 23, 1992

[30] Foreign Application Priority Data

Mar. 29, 1991 [JP] Japan .................................. 3-067152

[51] Int. Cl.⁵ .......................................... B65H 27/00
[52] U.S. Cl. ..................................... 226/196; 360/71; 360/95; 242/76
[58] Field of Search ............... 226/194, 190, 196, 197, 226/200; 242/76; 360/95, 71

[56] References Cited

U.S. PATENT DOCUMENTS

| | | | |
|---|---|---|---|
| 3,625,456 | 12/1971 | Hankins | 226/195 X |
| 3,968,920 | 7/1976 | Ballinger | 226/194 X |
| 4,054,925 | 10/1977 | Towner et al. | 242/55.19 R |
| 4,185,795 | 1/1980 | Walraven | 226/186 X |
| 4,295,595 | 10/1981 | Oosaka et al. | 226/136 X |
| 4,926,159 | 5/1990 | Bartlett | 310/317 |
| 4,938,404 | 7/1990 | Helms et al. | 226/7 X |
| 5,126,946 | 6/1992 | Ko | 226/15 X |
| 5,152,444 | 10/1992 | Saito | 226/196 |

Primary Examiner—Daniel P. Stodola
Assistant Examiner—Paul T. Bowen
Attorney, Agent, or Firm—Alvin Sinderbrand; William S. Frommer

[57] ABSTRACT

In a tape guide system having a tape guide device for guiding a magnetic tape in a video tape recorder or the like and which comprises a tape guide and an ultrasonic vibrator fixed to the tape guide for vibrating the tape guide with a standing wave, a drive device supplies a drive signal to the ultrasonic vibrator, and a temperature compensating circuit is provided for effecting temperature compensation of the drive signal supplied from the driver device to the ultrasonic vibrator.

8 Claims, 23 Drawing Sheets

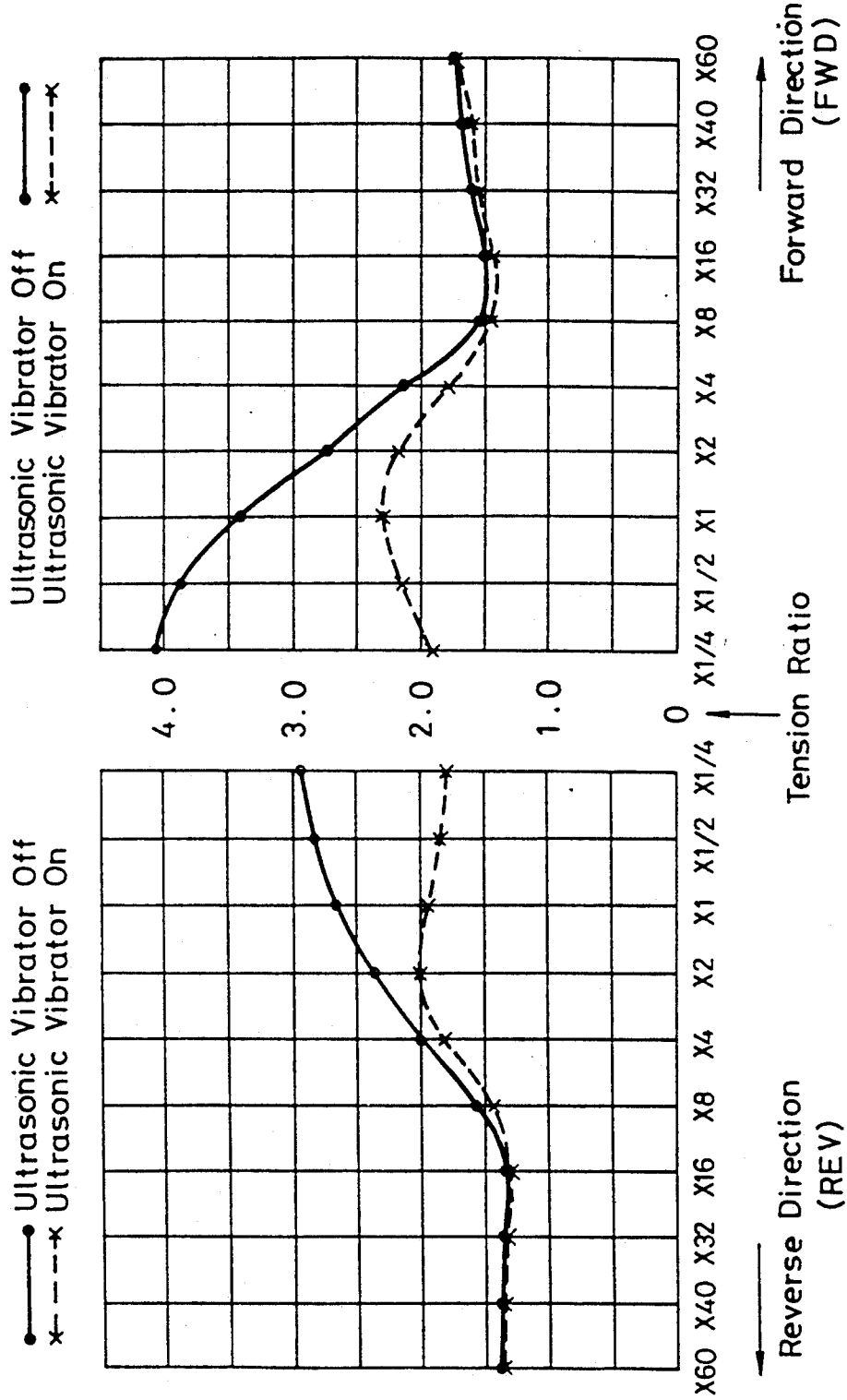

TAPE GUIDE SYSTEM WITH TEMPERATURE COMPENSATION FOR DRIVE SIGNAL

RELATED APPLICATION

This application is related to U.S. patent application Ser. No. 07/857,995, filed Mar. 26, 1992, and having a common assignee herewith as well as a common inventor.

BACKGROUND OF THE INVENTION

1. Field of the Invention

The present invention relates to a tape guide system for use in a video tape recorder or the like.

2. Description of the Prior Art

Tape guides for use in video tape recorders or the like are roughly classified into rotary tape guides and fixed tape guides.

The rotary tape guides are advantageous in that they impose less resistance to tapes guided thereby. However, the speeds of travel of the tapes guided by the rotary tape guides tend to reflect irregularities in the rotational speeds of bearings used in the rotary tape guides. Furthermore, if the direction in which a tape travels when it is guided by a rotary tape guide is not perpendicular to the axis of rotation of the rotary tape guide, then the tape is subjected to a transverse force applied by the tape guide. The latter drawback is aggravated when the tape is transversely shifted until an edge thereof is damaged by contact with a flange of the rotary tape guide, for example. Therefore, rotary tape guides are required to be machined and assembled with high accuracy, and hence cannot be manufactured easily.

The fixed tape guides allow tapes guided thereby to run stably, but present large resistance to the running tapes.

There has been a demand for a fixed tape guide which imposes smaller resistance to a running tape. One of such fixed tape guides that meet such a demand is an air tape guide for ejecting air from small holes defined in the surface of a guide body to float a tape off the guide body for thereby reducing the resistance applied to the tape. The air tape guide is still problematic since a compressor is required as an air pressure source.

To eliminate the drawbacks of the conventional tape guides, there has been proposed an ultrasonic vibration tape guide device as disclosed in Japanese patent application No. 02-103627. The ultrasonic vibration tape guide device employs an ultrasonic energy to reduce resistance to a running tape while allowing the tape to run stably as with fixed tape guides. The ultrasonic vibration tape guide device is adjustable in height. The heretofore proposed ultrasonic vibration tape guide device will be described below with reference to FIG. 1 of the accompanying drawings.

As shown in FIG. 1, the ultrasonic vibration tape guide device, generally designated by the reference numeral 1, includes a main shaft 5 mounted vertically on a base 18, and an ultrasonic vibrator 3 fixed to a guide member 2 that is supported on support teeth 7b of a cylindrical support shaft 7 of brass.

The ultrasonic vibrator 3 comprises a piezoelectric element having a number of piezoelectric ceramic plates with positive and negative electrodes interposed alternately therebetween. The positive electrodes are electrically connected to a positive electrode plate on one side, and the negative electrodes are electrically connected to a negative electrode plate on another side. An insulating member is attached to one end surface of the piezoelectric ceramic element, with the other end surface serving as a fixing surface.

A positive lead 3a is connected to the positive electrode plate of the ultrasonic vibrator 3, whereas a negative lead 3b is connected to the negative electrode plate of the ultrasonic vibrator 3.

The end surface serving as the fixing surface of the ultrasonic vibrator 3 is of a curved shape complementary to an outer circumferential surface of the guide member 2, and is bonded thereto.

Lower and upper flanges 9, 10 are disposed in abutment against lower and upper ends, respectively, of the support shaft 7, for guiding opposite edges of a tape wound around the guide member 2.

The main shaft 5 extends through the lower and upper flanges 9, 10 and the support shaft 7. A height adjustment screw 6 is fitted in an upper end of the support shaft 7, and threaded over a screw 23 on the upper end of the main shaft 5.

The upper flange 10 is fastened to an upper end surface of an attachment 8 by a screw 15. The lower flange 9 is fixed to a lower end surface of the attachment 8 by fixing pins 22, 24.

The attachment 8 has an ultrasonic vibrator storage space 8a defined therein which houses the ultrasonic vibrator 3. As shown in FIG. 2 of the accompanying drawings, the ultrasonic vibrator storage space 8a is defined as a hole in the shape of a rectangular parallelepiped between side walls 8b having respective stopper insertion holes 8c defined therein.

Disc-shaped stoppers 39 of rubber have engaging protrusions 39a fitted respectively in the stopper insertion holes 8c. The ultrasonic vibrator 3 is sandwiched between the stoppers 39 to prevent the guide member 2 from rotating with respect to the attachment 8.

The attachment 8 keeps the lower and upper flanges 9, 10 parallel to each other and spaced from each other by a distance that is about 0.1 mm larger than the length of the guide member 2.

As shown in FIG. 1, the lower flange 9 is normally urged upwardly under the bias of a coil spring 35 disposed around the main shaft 5 between the lower flange 9 and the base 18. The base 18 has a pin insertion hole 20 in which there is inserted an end of the fixing pin 22 that projects downwardly from the lower flange 9.

When the height adjustment screw 6 is turned, the guide member 2 is adjusted in height under or against the bias of the coil spring 35.

FIG. 3 of the accompanying drawings shows standing-wave vibrations of the guide member 2 caused when an AC voltage is applied to the ultrasonic vibrator 3, the standing-wave vibrations being illustrated along line X—X. Dotted lines N represent nodes on the guide member 2 where the vibrations have zero amplitude. The nodes N on the guide members 2 are axially spaced from the ends of the guide members 2 by a distance n, and the support teeth 7b are also axially spaced from the ends of the guide member 2 by the distance n, i.e., are positioned at the nodes N.

FIG. 4 of the accompanying drawings shows a video tape recorder 70 including a tape guide assembly 64 which incorporates two ultrasonic vibration tape guide devices 1 shown in FIGS. 1 and 2, with a tape cassette 41 being shown mounted so as to receive portions of the tape guide assembly 64 within a cavity 41a of the cassette.

As shown in FIG. 4, the tape guide assembly 64 has supply and takeup reels 42, 43, a plurality of tape guides 44, 45, 48, 49, 50, and a capstan 46 mounted on a base 40 which also supports recording and reproducing heads 47 for an audio signal or the like, and an erase head 51.

The cassette 41 has the cavity 41a defined in a front portion thereof, and tape guides 57, 58 disposed at opposite sides of the cavity 41a for guiding a tape 59 between reels 42, 43 in a run extending across the front side of the cavity 41a. The ultrasonic vibration tape guide devices 1, a pinch roller 65, and slider guides 60, 61 of the tape guide assembly 64 are positioned within the cavity 41a in back of the tape 59.

Stoppers 53, 54 serve to position the slider guides 60, 61 with respect to a rotary head drum 52. Connectors 55, 56 are attached respectively to the stoppers 53, 54 and have respective terminal pins 55a, 56a for supplying an AC voltage from the video tape recorder 70 to the slider guides 60, 61.

FIG. 5 of the accompanying drawings illustrates the position of the components of the tape guide assembly 64 when the tape 59 is drawn from the tape cassette 41 and wound around the rotary head drum 52 for recording signals on or reproducing signals from the tape 59.

More specifically, the slider guides 60, 61, the ultrasonic vibration tape guide devices 1, and the pinch roller 65 are moved from the positions shown in FIG. 4 to the positions shown in FIG. 5 for winding or loading the tape 59 around the rotary head drum 52.

At this time, respective positioning pins 60a, 61a of the slider guides 60, 61 are received and positioned in respective V-shaped grooves 53a, 54a of the stoppers 53, 54. When the ultrasonic vibration tape guide devices 1 move to the positions shown in FIG. 5, the pinch roller 65 moves into the position confronting the capstan 46. The tape guide assembly 64 now positions the tape for the recording of signals on or the reproducing of signals from the tape 59.

In each of the tape guide devices 1, the guide member 2 is ultrasonically vibrated by the ultrasonic vibrator 3 to reduce friction between the tape 59 and the guide member 2 which are held in contact with each other, for allowing the tape 59 to run smoothly. When a drive signal is applied to the ultrasonic vibrator 3 to vibrate the same, the temperature of the tape guide device 1 is increased thereby to vary the resonant frequency thereof (by 9 Hz for one degree, for example). Therefore, the tape guide devices may not be actuated for smooth tape transport at some temperatures.

OBJECTS AND SUMMARY OF THE INVENTION

In view of the aforesaid drawbacks of the conventional tape guide devices, it is an object of the present invention to provide a tape guide system capable of immediate phase control of a drive signal at any temperatures.

According to the present invention, there is provided a tape guide system comprising a tape guide device for guiding a tape in contact therewith, the tape guide device comprising a tape guide and an ultrasonic vibrator fixed to the tape guide for vibrating the tape guide with a standing wave, drive means for supplying a drive signal to the ultrasonic vibrator, and temperature compensating means for effecting temperature compensation of the drive signal supplied from the drive means to the ultrasonic vibrator.

Since the drive signal suppled to the ultrasonic vibrator of the tape guide device is temperature-compensated, the drive signal can well be controlled in phase at any temperatures.

The above and other objects, features, and advantages of the present invention will become apparent from the following description of illustrative embodiments thereof to be read in conjunction with the accompanying drawings, in which like reference numerals represent the same or similar objects.

BRIEF DESCRIPTION OF THE DRAWINGS

FIG. 24 is a graph of tension ratios between supply and takeup reels in reverse and forward directions.

DETAILED DESCRIPTION OF THE PREFERRED EMBODIMENTS

First, a tape guide system according to the present invention will be described below with reference to FIGS. 9 through 14.

Figure 9:
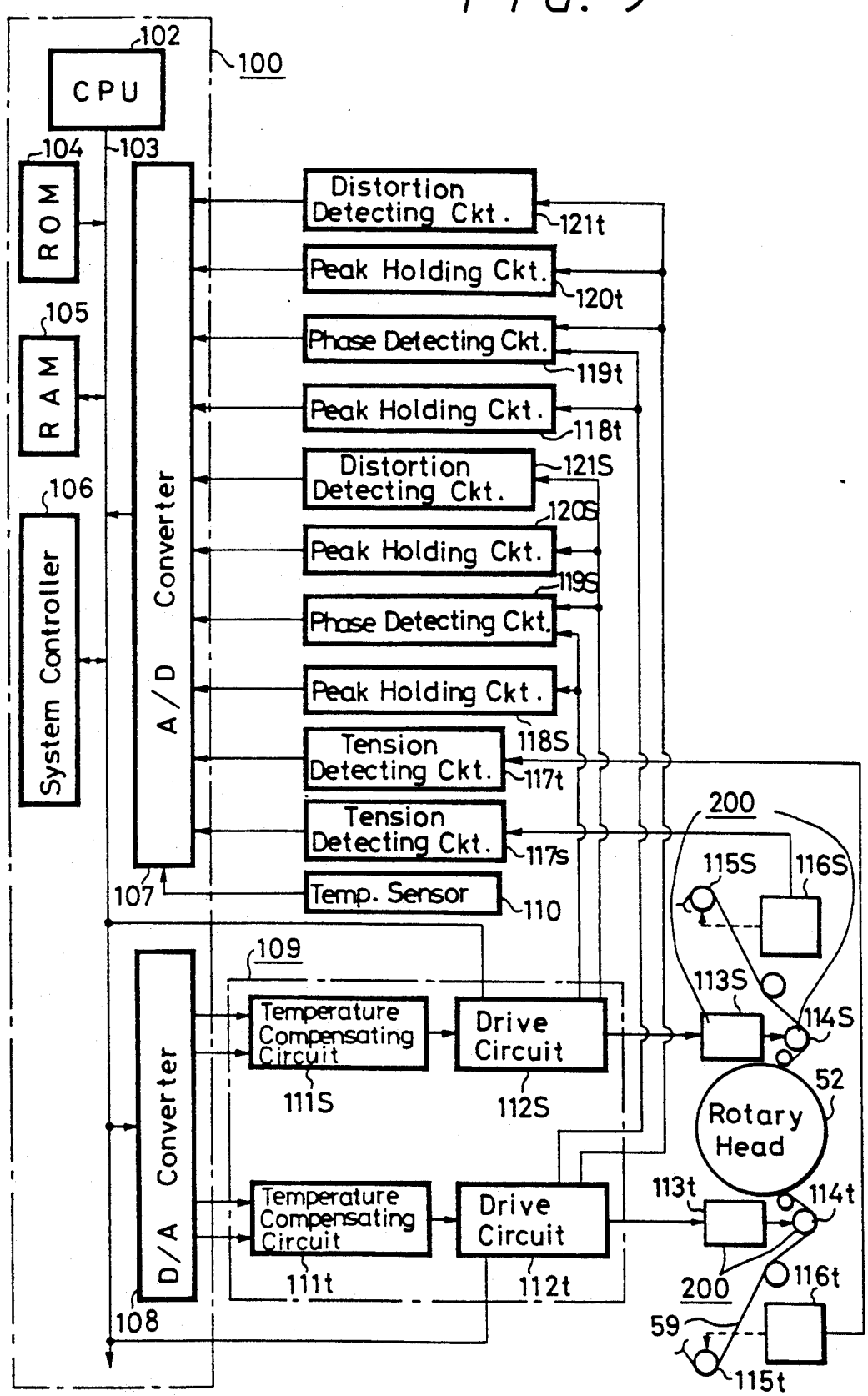
FIG. 9 is a detailed block diagram of the tape guide system shown in FIG. 6.

As shown in FIG. 9, the tape guide system according to the present invention includes a rotary head drum 52, a movable guide 115s near a supply reel (not shown), a tape guide 114s for guiding a tape 59 from the supply reel to the drum 51, a movable guide 115t near a takeup reel (not shown), and a tape guide 114t for guiding the tape 59 from the drum toward the takeup reel. The tape 59 that is unwound from the supply reel is guided by these tape guides 115s, 114s, 115t, 115s so as to be wound around the rotary head drum 52 through a predetermined wrap angle. Ultrasonic vibrators 113s, 113t have end surfaces bonded to the tape guides 114s, 114t, respectively. The ultrasonic vibrator 113s and the tape guide 114s, and the ultrasonic vibrator 113t and the tape guide 114t jointly serve as respective tape guide devices 200.

The tape guide system also includes a control device 100 comprising a CPU 102, a bus 103 composed of a data bus, an address bus, and a control bus, a ROM 104, a RAM 105, a system controller 106, an A/D (analog-to-digital) converter 107, and a D/A (digital-to-analog) converter 108.

The tape guide system also includes a driver device 109 comprising temperature compensating circuits 111s, 111t and respective drive circuits 112s, 112t.

The temperature compensating circuit 111s adds an offset signal and a control signal which are supplied from the CPU 102 through the bus 103 and the D/A converter 108, and supplies a corresponding sum signal to the drive circuit 112s. The drive circuit 112s generates a signal in response to the supplied sum signal, varies the gain of the generated signal in response to gain data supplied to circuit 112s from the CPU 102 through the bus 103, and supplies the signal with the varied gain as a drive signal to the tape guide device 200 which is composed of the ultrasonic vibrator 113s and the tape guide 114s.

Similarly, the temperature compensating circuit 111t adds an offset signal and a control signal which are supplied from the CPU 102 through the bus 103 and the D/A converter 108, and supplies a corresponding sum signal to the drive circuit 112t. The drive circuit 112t generates a signal in response to the supplied sum signal, varies the gain of the generated signal in response to gain data supplied to circuit 112t from the CPU 102 through the bus 103, and supplies the signal with the varied gain as a drive signal to the tape guide device 200 which is composed of the ultrasonic vibrator 113t and the tape guide 114t.

A temperature sensor 110 detects an ambient temperature, and supplies a temperature signal indicative of the detected temperature to the CPU 102 through the A/D converter 107 and the bus 103.

A magnetic angle sensor 116s is attached to a support for the movable guide 115s. The magnetic angle sensor 116s detects the distance which the movable guide 115s moves under the tension of the tape 59, and supplies a signal indicative of the detected distance to a tension detecting circuit 117s. The tension detecting circuit 117s detects the tension of the tape 59 based on the signal supplied from the magnetic sensor 116s, and supplies a signal indicative of the detected tension to the CPU 102 through the A/D converter 107 and the bus 103.

Similarly, a magnetic angle sensor 116t is attached, to a support for the movable guide 115t. The magnetic angle sensor 116t detects the distance which the movable guide 115t moves under the tension of the tape 59, and supplies a signal indicative of the detected distance to a tension detecting circuit 117t. The tension detecting circuit 117t detects the tension of the tape 59 based on the signal supplied from the magnetic sensor 116t, and supplies a signal indicative of the detected tension to the CPU 102 through the A/D converter 107 and the bus 103.

A peak holding circuit 118s produces a substantially direct current signal from a drive signal generated by the drive circuit 112s which drives the tape guide device 200 on the side of the supply reel, and supplies the produced current signal to the CPU 102 through the A/D converter 107 and the bus 103. The current signal will be used in a constant power control process (described later on).

A peak holding circuit 120s produces a substantially direct voltage signal from a drive signal generated by the drive circuit 112s which drives the tape guide device 200 on the side of the supply reel, and supplies the produced voltage signal to the CPU 102 through the A/D converter 107 and the bus 103. The voltage signal will be used in the constant power control process and a temperature compensation process (described later on).

A phase detecting circuit 119s produces a voltage signal and a current signal from a sine-wave drive signal generated by the drive circuit 112s, and then produces rectangular signals respectively from the voltage and current signals thus produced. The phase detecting circuit 119s then detects a phase shift between the rectangular signals, i.e., a phase shift between the voltage and the current, and supplies a signal indicative of the detected phase shift to the CPU 102 through the A/D converter 107 and the bus 103.

A distortion detecting circuit 121s produces a voltage signal from a sine-wave drive signal generated by the drive circuit 112s, and then extracts a harmonic component from the voltage signal thus produced. The distortion detecting circuit 121s produces a substantially direct voltage signal from the extracted harmonic component, and supplies thus voltage signal to the CPU 102 through the A/D converter 107 and the bus 103.

A peak holding circuit 118t produces a substantially direct current signal from a drive signal generated by the drive circuit 112t which drives the tape guide device 200 on the side of the takeup reel, and supplies the produced direct current signal to the CPU 102 through the A/D converter 107 and the bus 103. The direct current signal will be used in the constant power control process (to be described later).

A peak holding circuit 120t produces a substantially direct voltage signal from a drive signal generated by the drive circuit 112t which drives the tape guide device 200 on the side of the takeup reel, and supplies the produced direct voltage signal to the CPU 102 through the A/D converter 107 and the bus 103. The direct voltage signal will be used in the constant power control process and the temperature compensation process (as hereinafter described).

A phase detecting circuit 119t produces a voltage signal and a current signal from a sine-wave drive signal generated by the drive circuit 112t, and then produces rectangular signals respectively from the voltage and current signals thus produced. The phase detecting circuit 119t then detects a phase shift between the rectangular signals, i.e., a phase shift between the voltage and the current, and supplies a signal indicative of the detected phase shift to the CPU 102 through the A/D converter 107 and the bus 103.

A distortion detecting circuit 121t produces a voltage signal from a sine-wave drive signal generated by the drive circuit 112t, and then extracts a harmonic component from the voltage signal thus produced. The distortion detecting circuit 121t produces a substantially direct voltage signal from the extracted harmonic component, and supplies the produced voltage signal to the CPU 102 through the A/D converter 107 and the bus 103.

Figure 1:
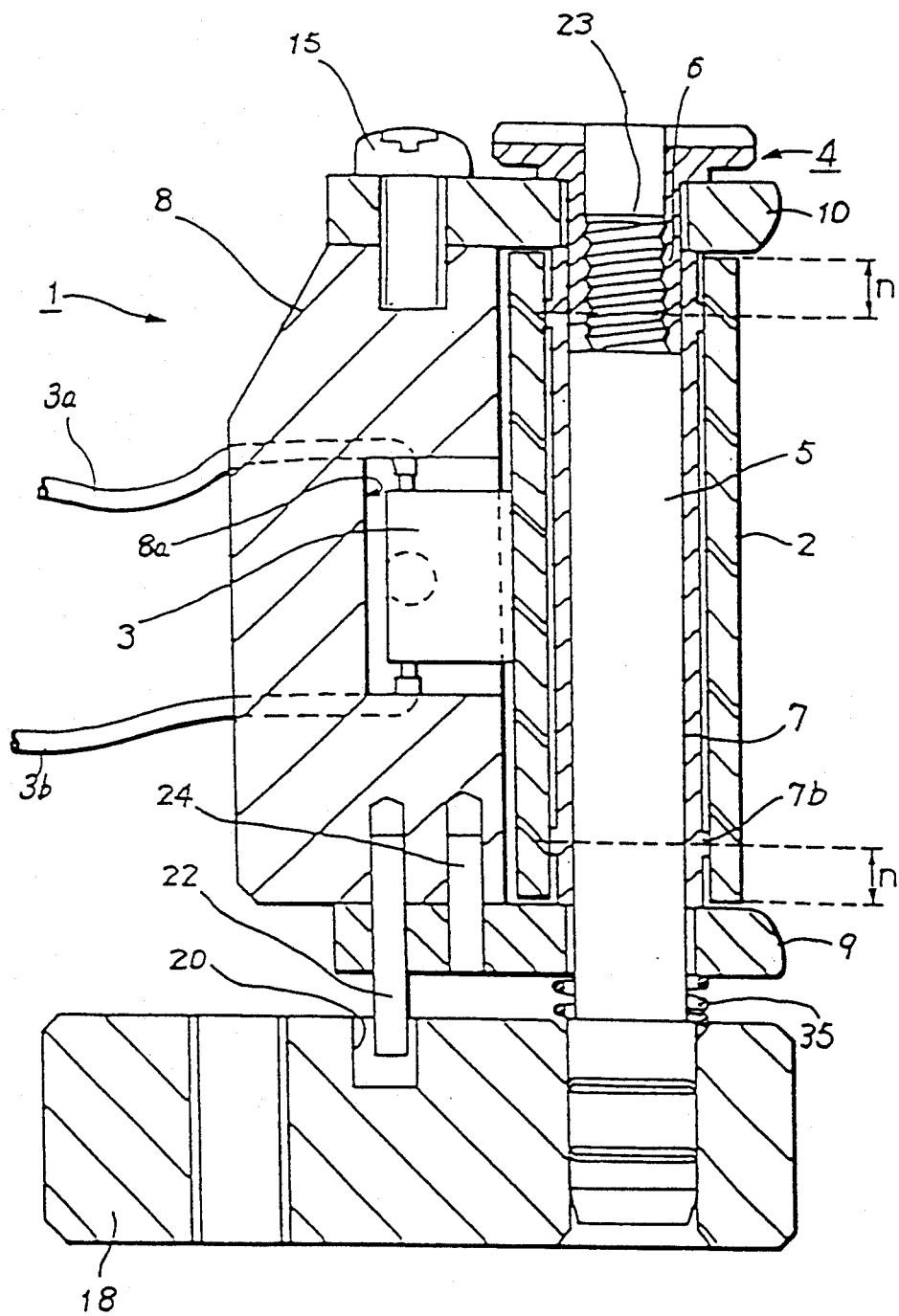
FIG. 1 is a cross-sectional view of a conventional tape guide device.
Figure 2:
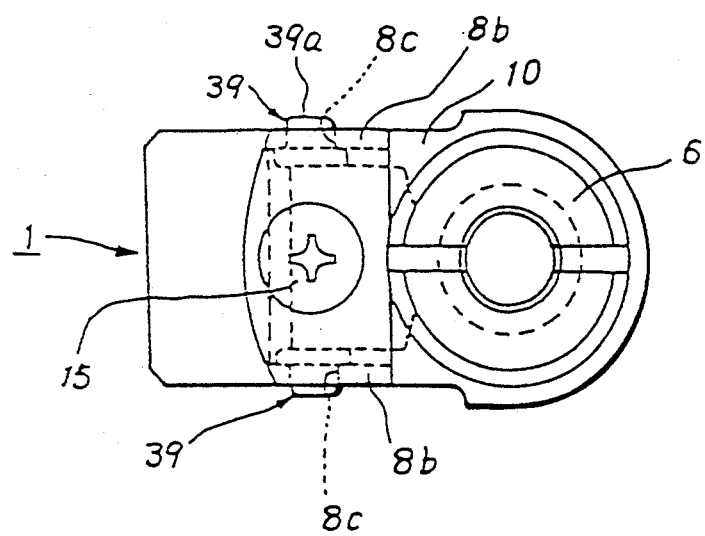
FIG. 2 is a plan view of the conventional tape guide device.
Figure 3:
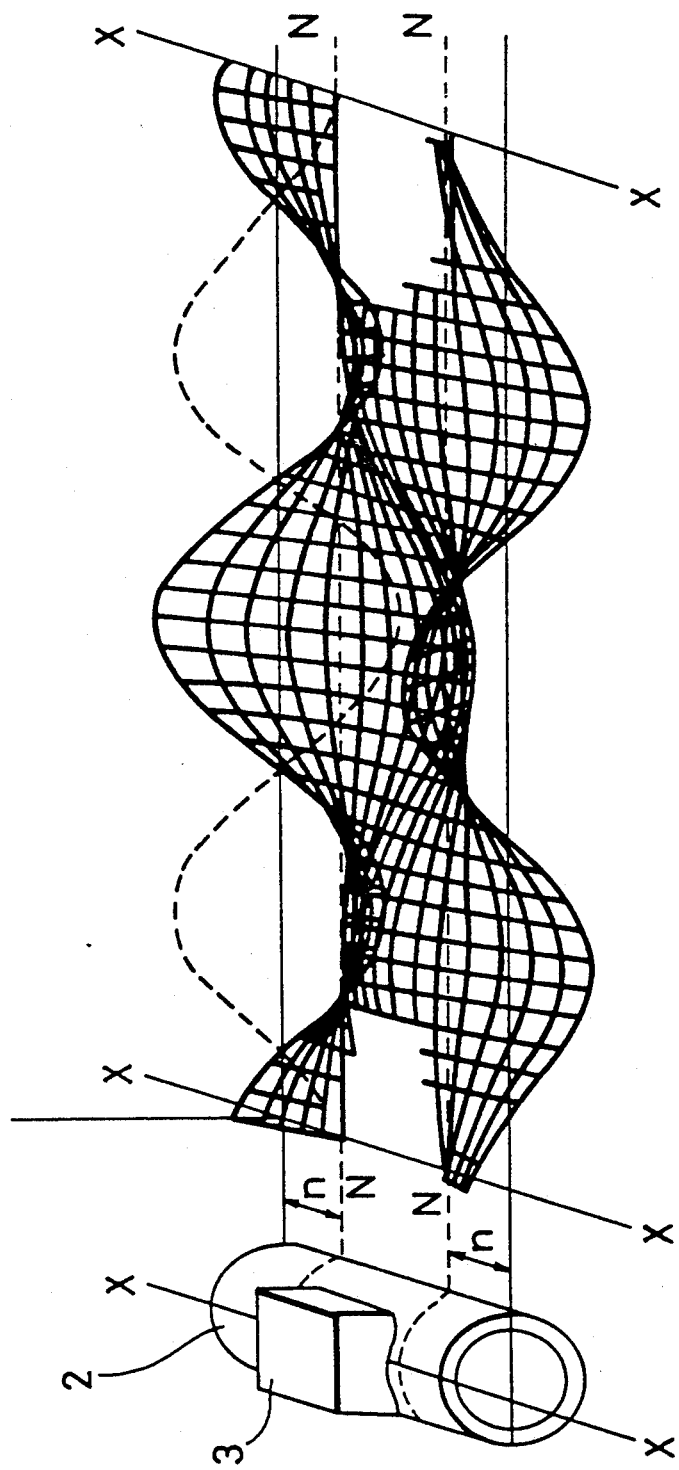
FIG. 3 is a graph showing standing-wave vibrations of the conventional tape guide device.

Each of the tape guide devices 200 has the structure shown in FIGS. 6 and 7, and which is seen to be identical to that of each of the ultrasonic vibration tape guide devices 1 shown in FIGS. 1 and 2, and hence will not be described in detail below.

Figure 4:
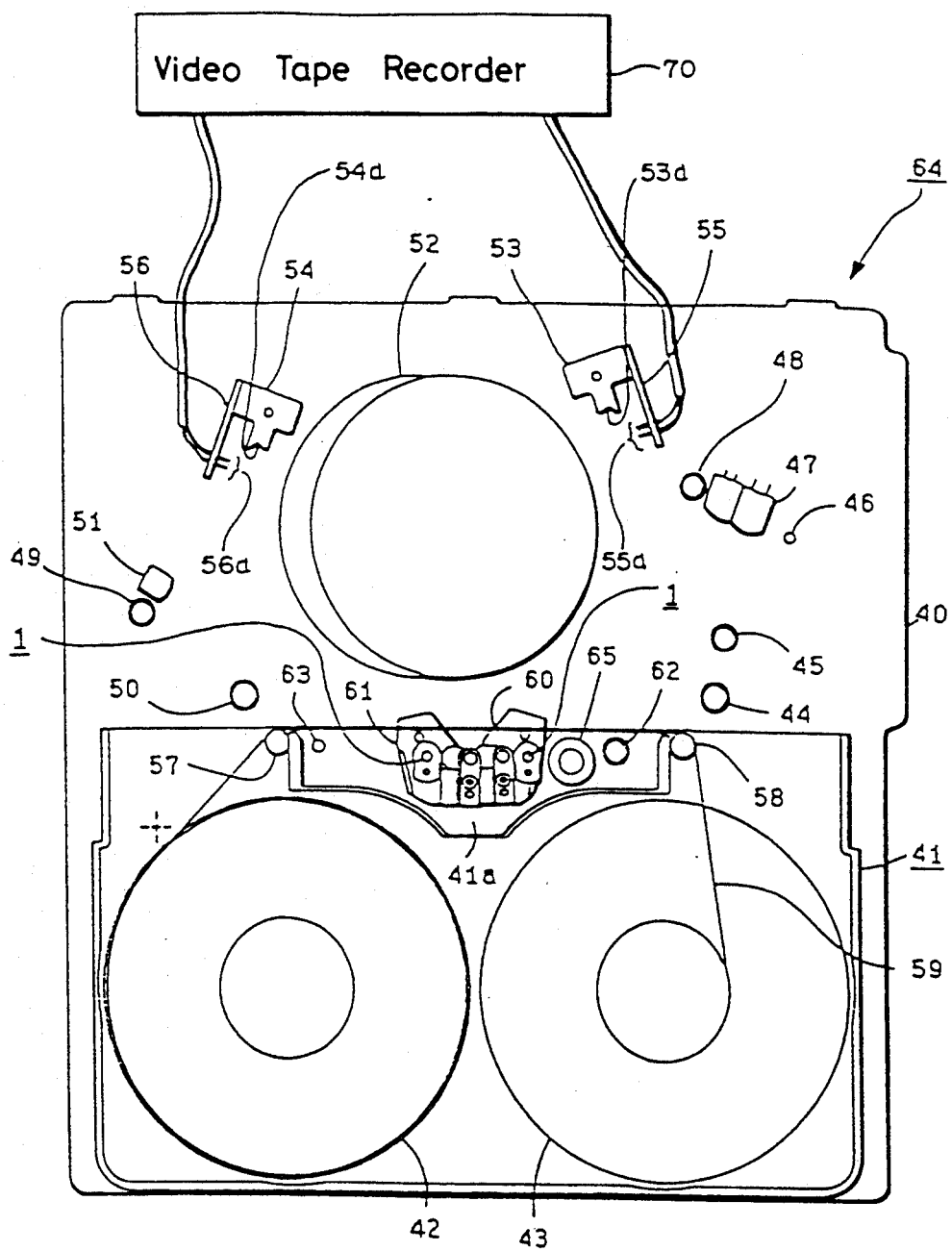
FIG. 4 is a plan view of a video tape recorder including a tape guide assembly which incorporates conventional tape guide devices.
Figure 5:
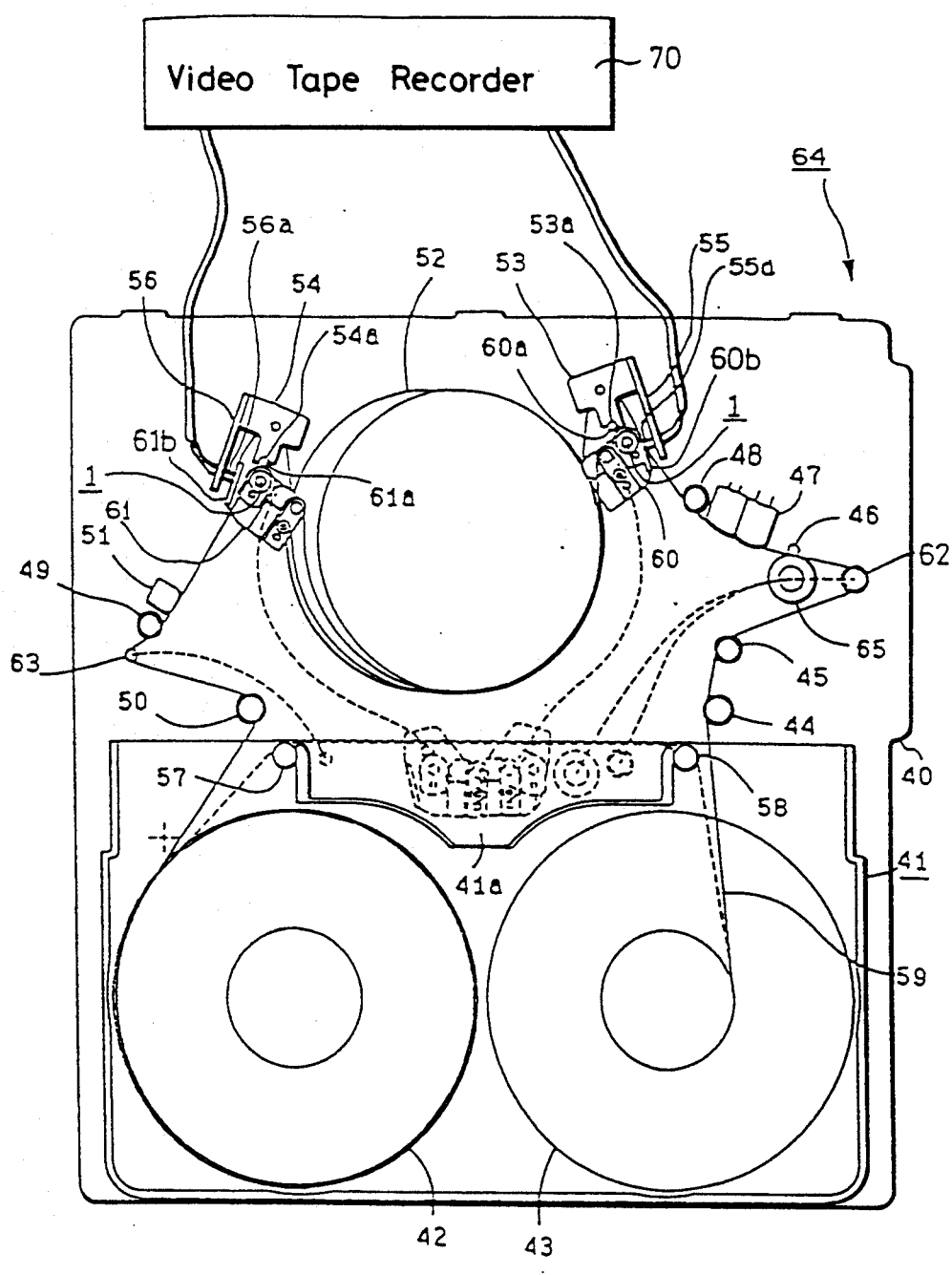
FIG. 5 is a plan view similar to FIG. 4, but showing the positions of the components when a tape is loaded.
Figure 6:
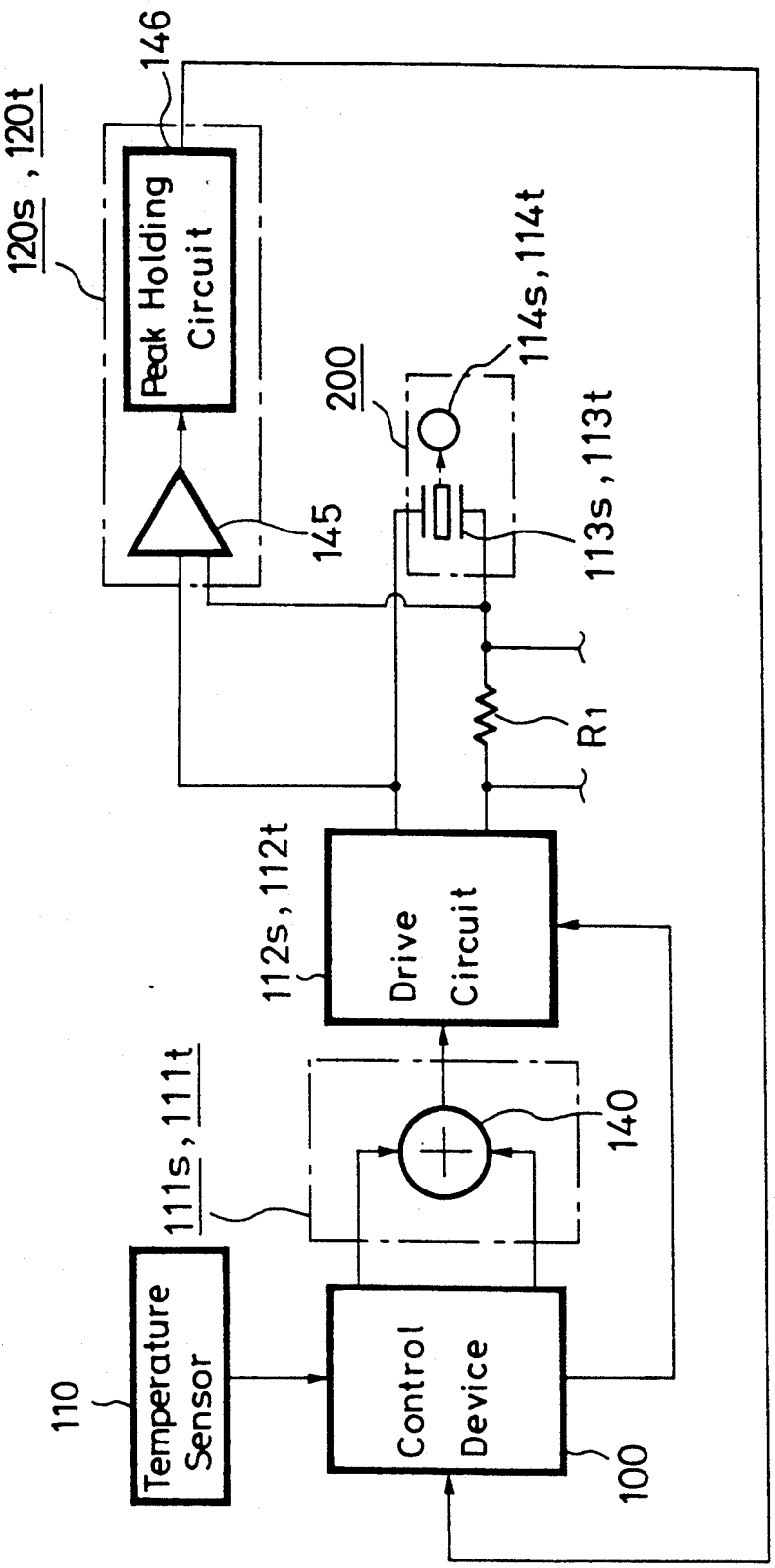
FIG. 6 is a block diagram of a tape guide system according to an embodiment of the present invention.
Figure 7:
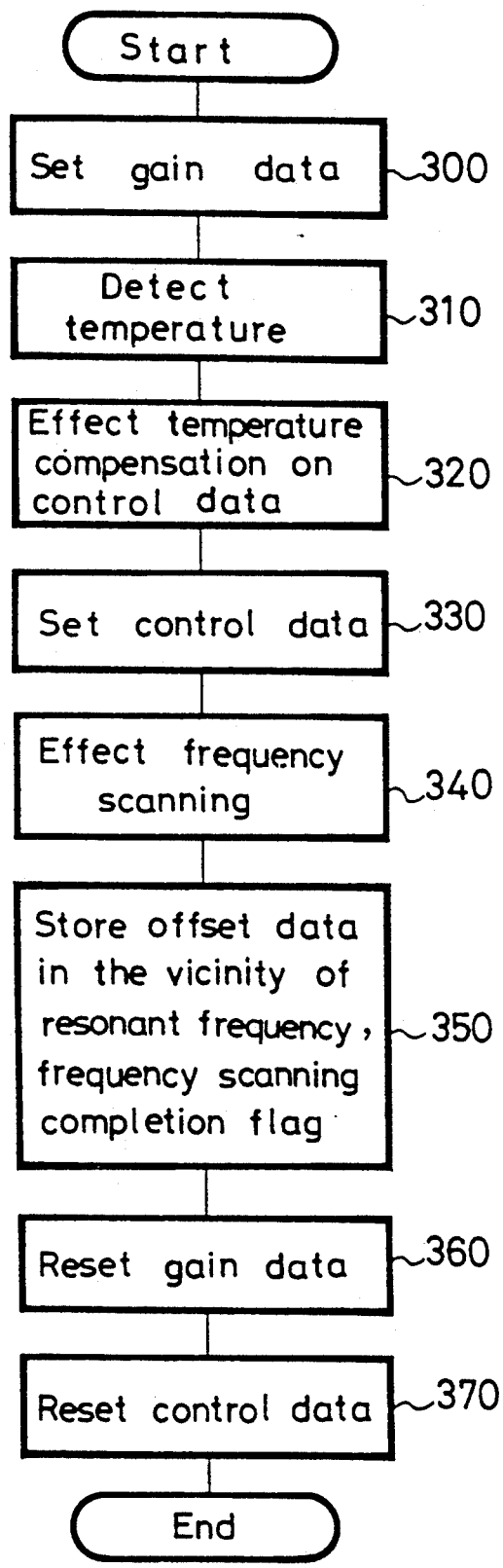
FIG. 7 is a flowchart of an operation sequence of the tape guide system shown in FIG. 6.
Figure 13:
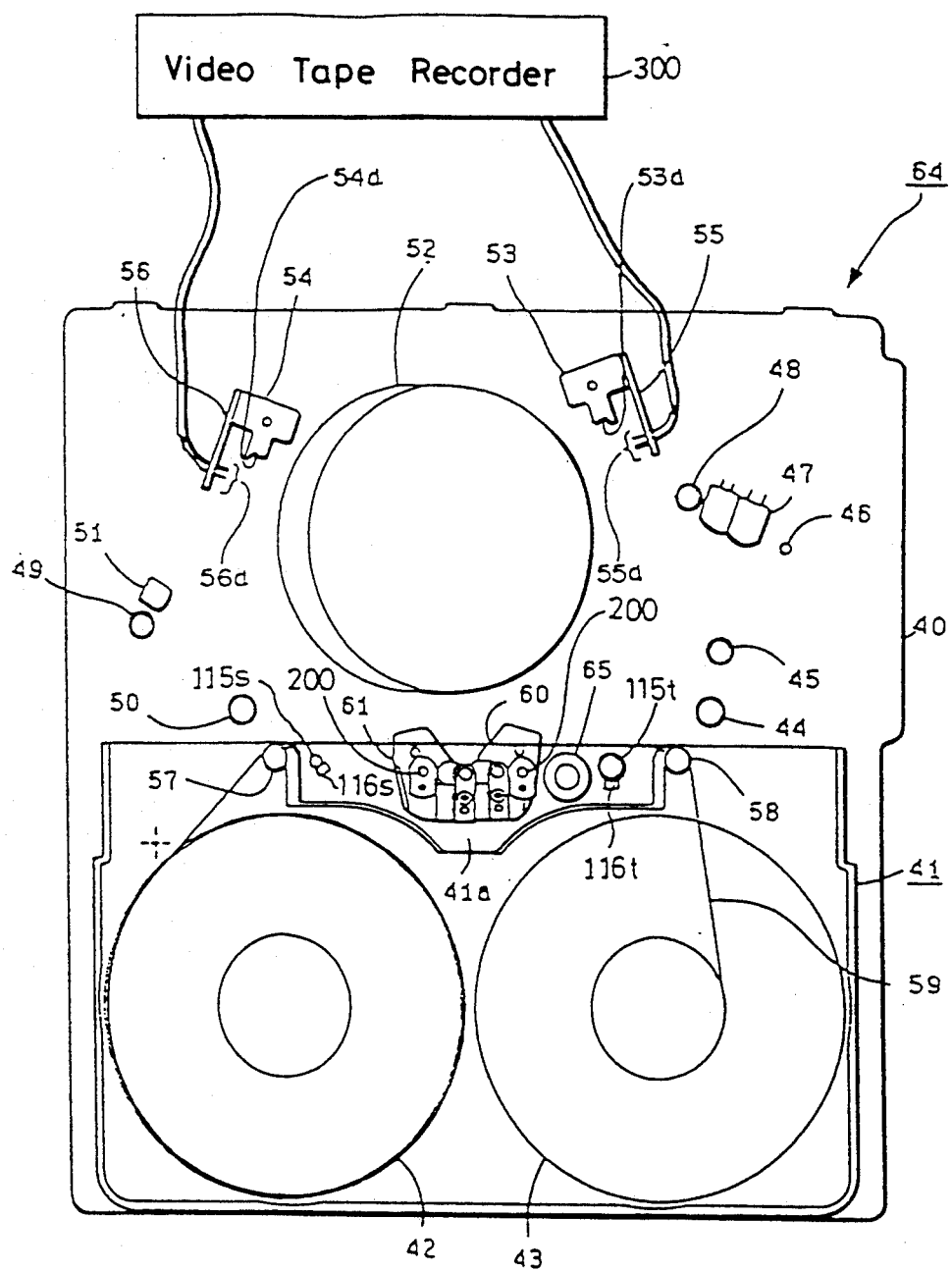
FIG. 13 is a plan view of a video tape recorder including a tape guide assembly which incorporates the tape guide system according to the present invention.

FIG. 13 shows a video tape recorder 300 including a tape guide assembly 64 which incorporates two tape guide devices 200 shown in FIGS. 6 and 7, with a tape cassette 41 mounted on the tape guide assembly 64. Those parts shown in FIG. 13 which are identical to or correspond to those shown in FIG. 4 are denoted by identical reference numerals.

Thus, the tape guide assembly 65 on FIG. 13 is shown to have supply and takeup reels 42, 43, a plurality of tape guides 44, 45, 48, 49, 50, and a capstan 46 mounted on a base 40 which also supports, recording and reproducing heads 47 for an audio signal or the like, and an erase head 51.

The cassette 41 has a cavity 41a defined in a front portion thereof, and tape guides 57, 58 disposed at opposite sides of the cavity 41a for guiding a tape 59 between reels 42, 43 in a run extending across the front side of the cavity 41a.

The tape guide devices 200, a pinch roller 65, and slider guides 60, 61 of the tape guide assembly 64 are positioned within the cavity 41a in back of the tape 59.

Stoppers 53, 54 serve to position the slider guides 60, 61 with respect to a rotary head drum 52. Connectors 55, 56 are attached respectively to the stoppers 53, 54 and have respective terminal pins 55a, 56a for supplying an AC voltage from the video tape recorder 200 to the slider guides 60, 61.

The video tape recorder 300 incorporates various circuits of the tape guide system in addition to the tape guide devices 200, including the control device 100, the driver device 109, the distortion detecting circuits 121s, 121t, the phase detecting circuits 119s, 119t, the tension detecting circuits 117s, 117t, the temperature sensor 110, and the peak holding circuits 118s, 118t, 120s, 120t. The angle sensors 116s, 116t are attached respectively to the movable guides 115s, 115t as shown in FIGS. 13 and 14.

Figure 14:
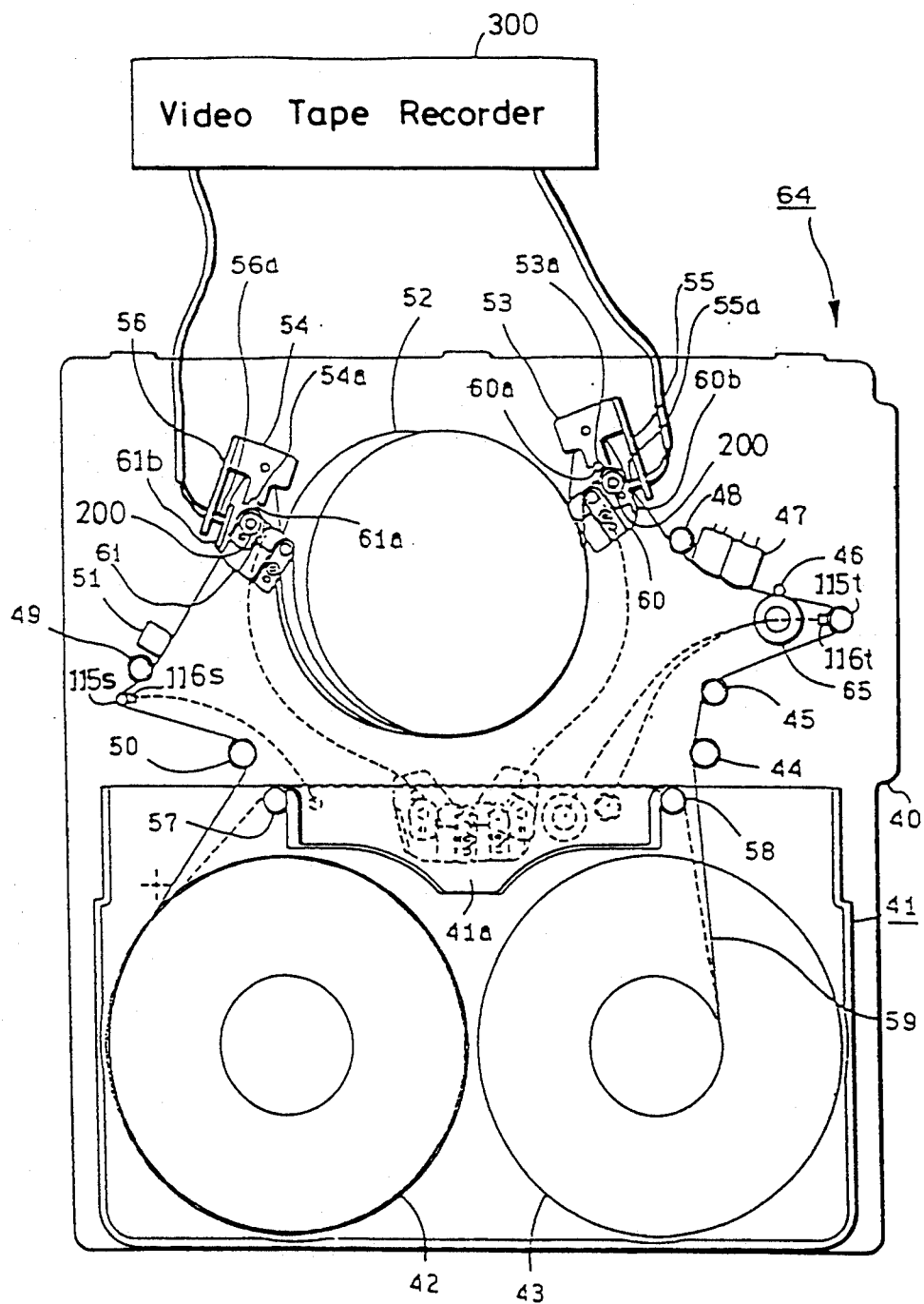
FIG. 14 is a plan view similar to FIG. 13, but showing positions of the components when a tape is loaded.

FIG. 14 illustrates the position of the components of the tape guide assembly 64 when the tape 59 is drawn from the tape cassette 41 and wound around the rotary head drum 52 for recording signals on or reproducing signals from the tape 59.

More specifically, the slider guides 60, 61, the tape guide devices 200, and the pinch roller 65 are moved from the positions shown in FIG. 13 to the positions shown in FIG. 14 for winding or loading the tape 59 around the rotary head drum 52.

At this time, respective positioning pins 60a, 61a of the slider guides 60, 61 are received and positioned in respective V-shaped grooves 53a, 54a of the stoppers 53, 54. When the tape guide devices 200 move to the positions shown in FIG. 14, the pinch roller 65 moves into the position confronting the capstan 46. The tape guide assembly 64 now positions the tape for the recording of signals on or the reproducing of signals from the tape 59.

The various circuits of the tape guide system apart from the tape guide devices 200 and their operation will be described in detail below. The suffixes "s" added to the reference numerals of some circuits indicate that the circuits are related to the supply reel, and the suffixes "t" added to the reference numerals of some circuits indicate that the circuits are related to the takeup reel. In the description that follows, identical circuits are denoted by identical reference numerals with suffixes "s" and "t", and only the circuit with a reference numeral with a suffix "s" will be described in detail.

A phase control process and a temperature compensation process for a drive signal will be described below. In order to operate the tape guide devices 200 efficiently, they may be driven at a resonant frequency (at a maximum impedance, the resonant frequency is being of 150 KHz±5 KHz~10 KHz, for example) because the tape guide devices 200 are driven by controlling currents supplied thereto, and hence as the impedance is higher, the current may be smaller to produce greater electric power. It has been confirmed that the resonant frequency varies with temperature (by 9 Hz for each degree, for example). Therefore, if the frequency is controlled so as to be constant, then the impedance varies with temperature, and a fixed output cannot be produced.

Figure 15:
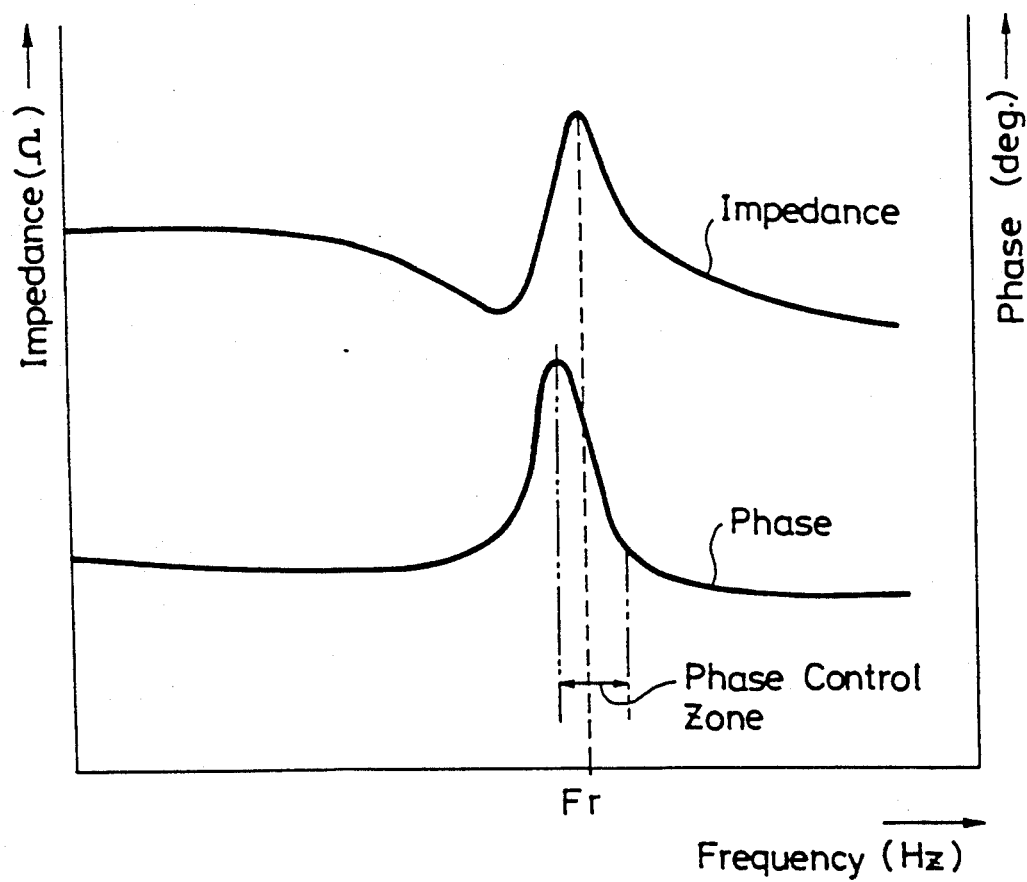
FIG. 15 is a graph showing impedance and phase curves in the vicinity of a resonant frequency of the tape guide device.

FIG. 15 shows impedance and phase curves in the vicinity of a resonant frequency in a graph having a lefthand vertical axis representative of the impedance ($\Omega$), a righthand vertical axis representative of the phase (deg.), and a horizontal axis representative of the frequency (KHz). The impedance curve to the lefthand vertical axis, whereas the phase is to be read with reference curve is to be read with reference to the righthand vertical axis.

From FIG. 15 it will be apparent that the resonant frequency Fr occurs where the impedance is highest, and that the phase largely varies in the vicinity of the resonant frequency Fr. The correlation between the phase and the resonant frequency Fr remains substantially constant at different temperatures. A phase control zone is established substantially between the two-dot-and-dash lines, on FIG. 15 and ranges from a point where the phase variation is a maximum to a point where the phase becomes substantially constant. The phase is controlled so as to be constant in this phase control zone, for thereby keeping the impedance constant.

To detect the resonant frequency, a frequency scanning process is effected on the tape guide devices 200 when they are replaced or used at first.

In the frequency scanning process, the drive current to drive each of the tape guide devices 200 is kept constant, and the vibration frequencies are changed with the drive voltage being detected. Since the drive voltage varies with the impedance and is maximum at the resonant frequency, the resonant frequency can be detected by detecting the maximum drive voltage.

The frequency scanning process and the phase control process subsequent to the frequency scanning process are carried out using the phase detecting circuits 121s, 121t of the tape guide system shown in FIG. 9.

Figure 16:
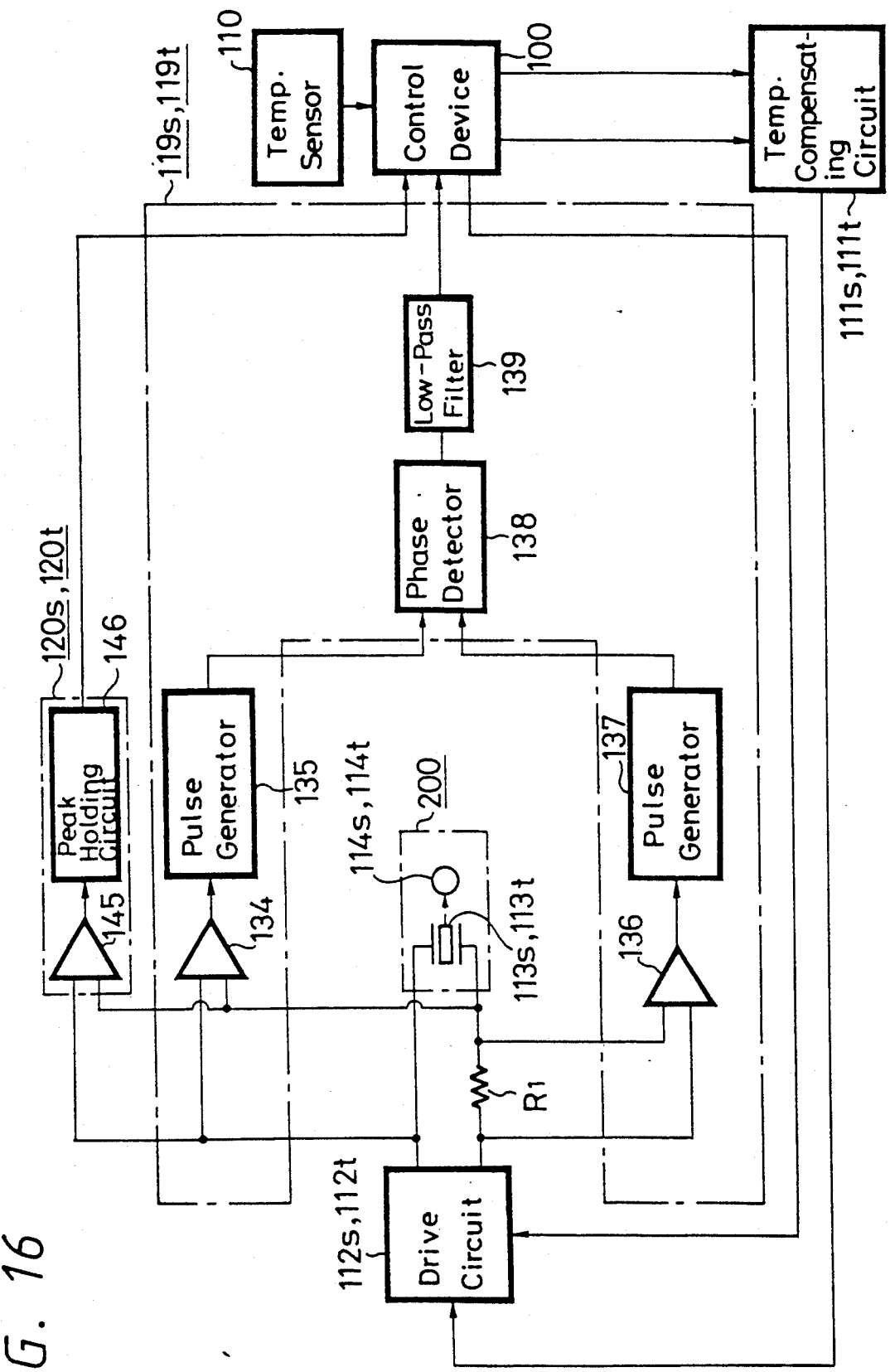
FIG. 16 is a block diagram of a phase control circuit of the tape guide system.

FIG. 16 shows the phase detecting circuits 121s, 121t in detail.

As shown in FIG. 16, one amplifier 134 has an input terminal connected to a line which interconnects the drive circuit 112s and one electrode plate of the ultrasonic vibrator 113s and another input terminal connected to another line which interconnects the drive circuit 112s and the other electrode plates of ultrasonic vibrator 113s. The amplifier 134 serves to extract a voltage signal from a drive signal from the drive circuit 112s. A pulse generator 135 converts a sine-wave voltage signal from the amplifier 134 into a respective rectangular voltage signal which is supplied to a phase detector 138.

One of the lines which interconnects the drive circuit 112s and the ultrasonic vibrator 113s has a resistor R1 therein. An amplifier 136 has one input terminal connected to one end of the resistor R1 and another input terminal connected to the other end of the resistor R1, for extracting the drive signal from the drive circuit 112s as a current signal. A pulse generator 137 converts a sine-wave current signal from the amplifier 136 into a respective rectangular voltage signal which is also supplied to the phase detector 138. The phase detector 138 detects a phase shift between the voltage signals from the pulse generators 134, 137, and supplies a phase signal indicative of the detected phase shift to the control device 100 through a low-pass filter 139.

An amplifier 145 has one input terminal connected to one of the lines which interconnects the drive circuit 112s and one electrode plate of the ultrasonic vibrator 113s and another input terminal connected to the line which interconnects the drive circuit 112s and the other electrode plate of the ultrasonic vibrator 113s. The amplifier 145 serves to extract a drive signal from the drive circuit 112s as a voltage signal, which is supplied to a peak holding circuit 146. The amplifier 145 and the peak holding circuit 146 jointly serve as the peak holding circuit 120s.

The control device 100 sets gain data for the drive circuit 112s to a constant value. The control device 100 also supplies an offset signal and a phase control signal both depending on the phase signal, to the temperature compensating circuit 111s. When the control device 100 detects a maximum drive voltage based on a substantially direct voltage signal from the peak holding circuit 120s, the control device 100 stores offset data and temperature data received from that temperature sensor 110 at the time.

A temperature compensating process will be described with reference to FIG. 6.

As shown in FIG. 6, the temperature compensating process employs the temperature compensating circuits 111s, 111t and the temperature sensor 110 shown in FIG. 9.

In FIG. 6, the offset signal and the phase control signal from the control device 100 are added by an adder 140 of the temperature compensating circuit 111s, and a sum signal from the adder 140 is supplied to the drive circuit 112s. The sine-wave voltage signal extracted by the amplifier 145 of the peak holding circuit 120s is supplied to the peak holding circuit 146, which converts the sine-wave voltage signal into a substantially direct voltage signal that is supplied to the control device 100 as an offset signal. The control device 100 modifies the offset signal and the phase control signal based on the temperature data from the temperature sensor 110.

Figure 17:
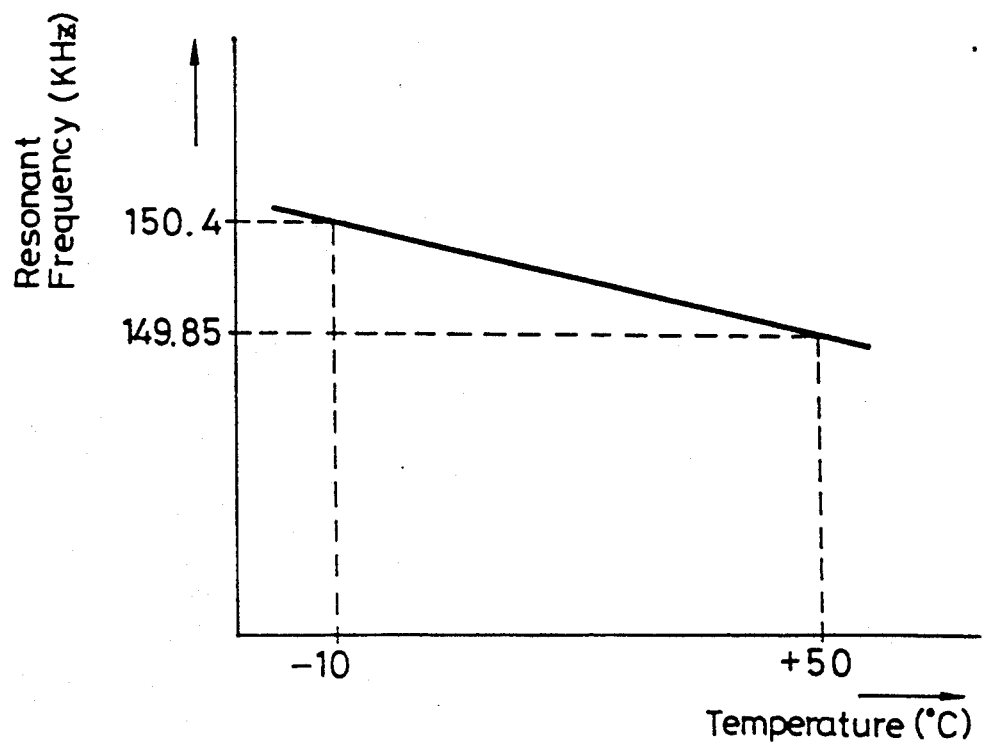
FIG. 17 is a graph showing the relationship between resonant frequencies and temperatures.

FIG. 17 is a graph showing the relationship between resonant frequencies and temperatures, the graph having a vertical axis representing the resonant frequencies (KHz) and a horizontal axis representing the temperatures (°C.).

As can be seen from FIG. 17, if the resonant frequency is variable within the range of from 149.85 KHz ~ 150.4 KHz, then it is possible to compensate for temperatures ranging from minus 10° C. to plus 50° C. The tape guide system according to the present invention is arranged to effect temperature compensation in the range of from minus 20° C. to plus 80° C. Since the temperature can be compensated for in such a wide range, the tape guide devices 200 can well be driven even when they are heated by vibrations.

The frequency scanning process and the temperature compensating process will be described below with reference to FIG. 7.

In a step 300, the control device 100 sets gain data, i.e., establishes predetermined gain data for the frequency scanning process. The drive circuit 112s now supplies a drive signal of a constant level to the ultrasonic vibrator 113s of the tape guide device 200. Control then goes to a step 310.

In the step 310, the control device 100 detects a temperature based on the temperature data from the temperature sensor 110. Control then goes to a step 320.

In the step 320, the control device 100 effects temperature compensation on control data, i.e., converts control data to be supplied to the adder 140 of the temperature compensating circuit 111s (FIG. 6) into control data depending on the temperature data. Control then goes to a step 330.

In the step 330, the control device 100 sets the control data, thus completing the temperature compensation. Control then goes to a step 340.

In the step 340, the control device 100 carries out the frequency scanning process. Control then goes to a step 350.

In the step 350, the control device 100 stores offset data in the vicinity of the resonant frequency where the drive voltage is maximum and also stores a flag representing the completion of the frequency scanning process. Control then goes to a step 360.

In the step 360, the control device 100 resets the gain data. Control then goes to a step 370.

In the step 370, the control device 100 resets the control data. The operation sequence shown in FIG. 7 now comes to an end.

In the above operation sequence, the control data is varied according to the temperature at the time the frequency scanning process is carried out, thus producing offset data at normal temperature. Only the offset data and the flag indicating completion of the frequency scanning process are required to be stored in the control device 100. The phase control process can be effected immediately after the frequency scanning process.

Another frequency scanning process will be described below with reference to FIG. 8.

In a step 400, the control device 100 sets gain data, i.e., establishes predetermined, gain data for the frequency scanning process, and the drive circuit 112s supplies a drive signal of a constant level determined by such gain data to the ultrasonic vibrator 113s of the tape guide device 200. Control then goes to a step 410.

In the step 410, the control device 100 carries out the frequency scanning process. Control then goes to a step 420.

In the step 420, the control device 100 stores offset data in the vicinity of the resonant frequency where the drive voltage is maximum and also stores the temperature data from the temperature sensor 110 and a flag representing the completion of the frequency scanning process. Control then goes to a step 430.

Figure 8:
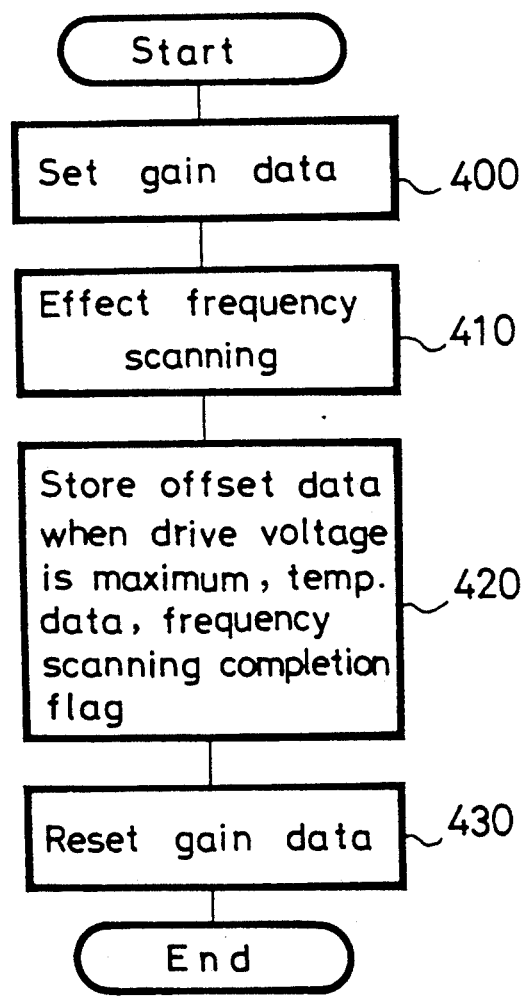
FIG. 8 is a flowchart of another operation sequence of the tape guide system shown in FIG. 6.

In the step 430, the control device 100 resets the gain data, whereupon, the operation sequence shown in FIG. 8 is ended.

In the modified operation sequence of FIG. 8, the control device 100 stores the temperature at the time of the frequency scanning process in addition to storing the offset data. In the subsequent phase control process, the control device 100 calculates the difference between the temperature data at the time and the stored temperature data, and effects compensation on the offset data based on the calculated temperature difference. The modified process makes it possible to effect the phase control process irrespective of the range of phase control.

The operation sequences shown in FIGS. 7 and 8 differ from each other in that the temperature compensation is effected in the frequency scanning process according to one of the operation sequences and it is effected in the phase control process according to the other operation sequence.

After the frequency scanning process is effected only once on the tape guide devices 200 when they are replaced or used at first, the phase control process can immediately be effected under any conditions. In the phase control process subsequent to the frequency scanning process, as shown in FIG. 16, the phase signal from the phase detector 138 is supplied through the low-pass filter 139 to the control device 100, which varies the control data (control signal) to be supplied to the drive circuit 112s according to the supplied phase signal. In this manner, the tape guide devices 200 can be driven efficiently at the resonant frequency at all times.

The constant power control process will be described below. The impedance at the resonant frequency varies from device to device or from temperature to temperature. Therefore, a completely constant drive signal cannot be produced merely by effecting the above described frequency scanning process and the subsequent phase control process.

The tape guide system serves to reduce the friction due to contact between the tape 59 and the guide member 2 (see FIG. 11) of each of the tape guide devices 200. It is not sufficient for the coefficient of friction between the tape 59 and the guide member 2 to be simply low, but is important to keep the coefficient of friction at a constant low level.

Figure 18:
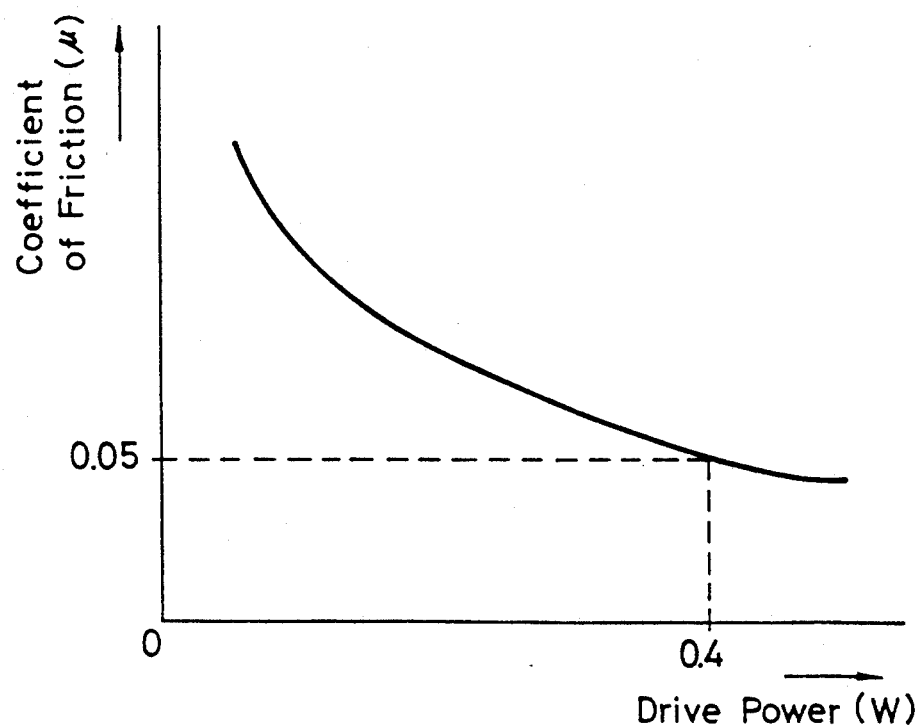
FIG. 18 is a graph showing the relationship between coefficients of friction and electric drive powers.

FIG. 18 is a graph showing the relationship between coefficients of friction and electric drive powers, the graph having a vertical axis representing the coefficients of friction ($\mu$) and a horizontal axis representing the electric drive powers (W).

It can be seen from FIG. 18 that the reduction in friction due to contact between the tape 59 and the guide member 2 of the tape guide device 200 is generally proportional to the electric drive power applied to drive the tape guide device 200. For example, with a ultrasonic vibration tape guide device at a ¼ speed or slower speeds, the coefficient of friction $\mu$ ranges from 0.03 to 0.05, with the electric drive power being about 0.4 W. With a fixed or non-vibrated tape guide, the coefficient of friction $\mu$ at the same electric drive power is in a higher range from 0.2 to 0.4.

The coefficient of friction $\mu$ achieved with an ultrasonic vibration tape guide becomes substantially constant when the electric drive power is 0.4 W or higher. This indicates that even when the current or voltage of the drive signal is increased, the coefficient of friction $\mu$ cannot be lowered below a certain value because of the difference in phase between the current and voltage of the drive current.

The amplitude of the voltage or current of the drive signal is therefore determined in relation to the difference in phase between the current and the voltage to render the electric power of the drive signal effective.

The constant power control process is carried out using the drive circuit 112s (112t). The constant power control process will be described below with reference to FIG. 19.

Figure 19:
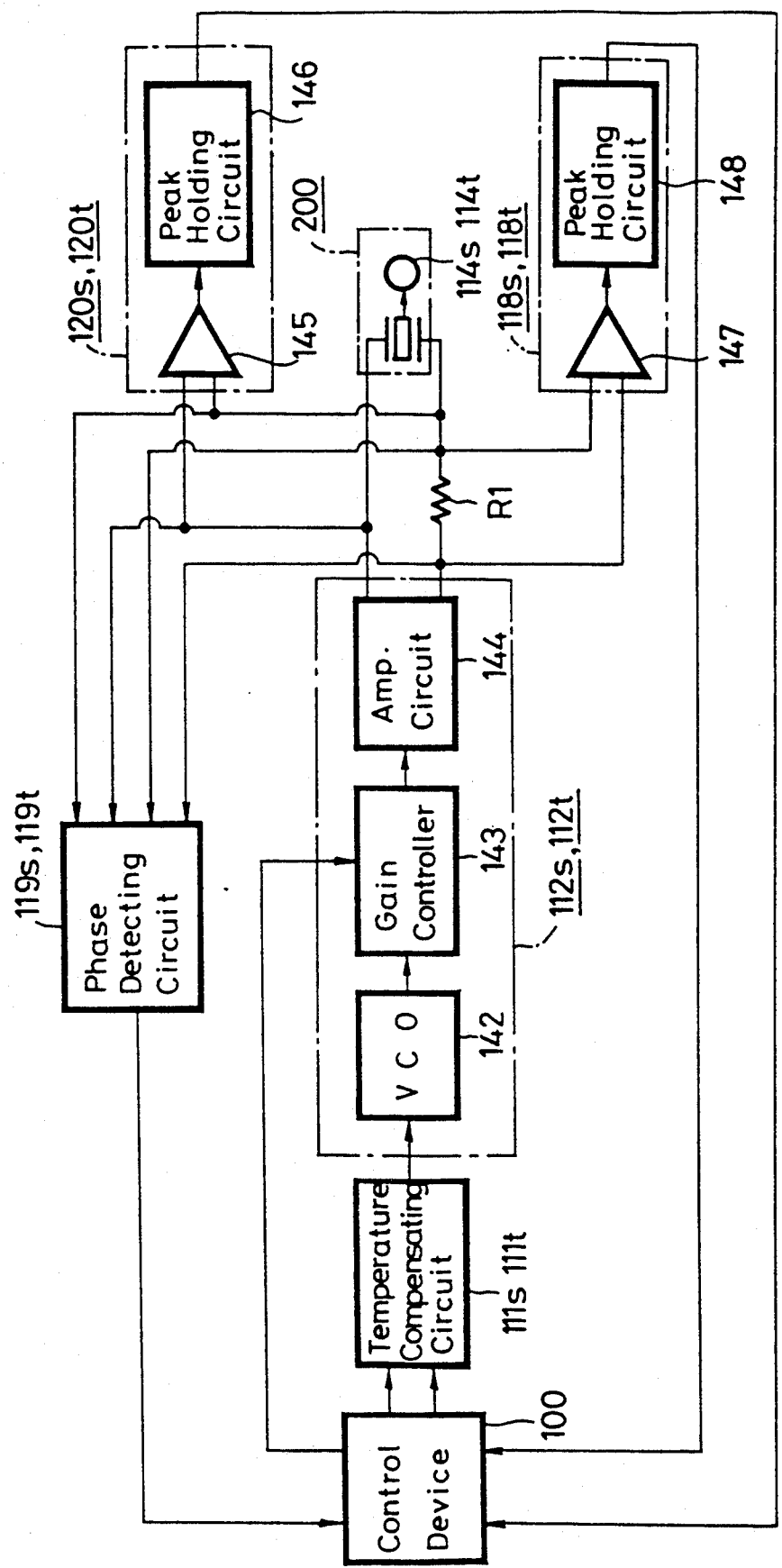
FIG. 19 is a block diagram of a drive circuit of the tape guide system.

In FIG. 19, the drive circuit 112s includes a voltage-controlled oscillator (VCO) 142 which oscillates at a frequency depending on the voltage of the sum signal, indicative of the sum of the control and offset signals, from the temperature compensating circuit 111s, to supply a sine-wave signal to a gain controller 143. The gain controller 143 varies the gain of the sine-wave signal from the voltage-oscillated oscillator 142 according to the gain data from the control device 100. The drive circuit 112s also includes an amplifier 144 such as a driver for converting the sine-wave signal from the gain controller 143 into a drive signal, which is then applied to the ultrasonic vibrator 113s of the tape guide device 200 to drive the latter.

The sine-wave voltage signal extracted from the amplifier 144 by the amplifier 145 of the peak holding circuit 120s is supplied to the peak holding circuit 146, which converts the sine-wave voltage signal into a substantially direct voltage signal that is supplied to the control device 100.

An amplifier 147 has one terminal connected to one of the lines which interconnects the amplifier 144 and one electrode plate of the ultrasonic vibrator 113s and another input terminal connected to the other line which interconnects the amplifier 144 and the other electrode plate of ultrasonic vibrator 113s. The amplifier 147 serves to extract a drive signal from the amplifier 144 as a voltage signal, which is supplied to a peak holding circuit 148. The peak holding circuit 148 converts the sine-wave voltage signal into a substantially direct current signal that is supplied to the control device 100. The amplifier 147 and the peak holding circuit 148 jointly serve as the peak holding circuit 118s.

The control device 100 determines an effective electric power to drive the tape guide device 200 based on the voltage signal from the peak holding circuit 120s, the current signal from the peak holding circuit 118s, and the phase signal from the phase detecting circuit 119s, and varies the gain data supplied to the gain controller 143 such that the determined effective electric power will be constant. The effective electric power W is determined according to the equation $W = V \cdot I \cdot \cos\theta$ where V is the voltage from the peak holding circuit 120s, I the current from the peak holding circuit 118s, and $\theta$ the phase shift or difference from the phase detector 119s.

Since the gain controller 143 is controlled so that the determined effective electric power will be constant, the reduction in the friction due to contact between the tape 59 and the guide member 2 of the tape guide device 200 can be held at a constant level at all times.

A distortion detecting process will now be described below. In the tape guide system, the ultrasonic vibrators 113s, 113t are actuated under harsh conditions, i.e., vibrated at a high resonant frequency. Therefore, the ultrasonic vibrators 113s, 113t tend to be detached from the respective tape guides 114s, 114t, and a defect such as a crack may be developed in the surfaces of the ultrasonic vibrators 113s, 113t.

The reduction in the friction due to contact between the tape 59 and the tape guides 114s, 114t, caused by ultrasonic vibrators 113s, 113t, is not largely affected by the waveform of vibrations of the ultrasonic vibrators 113s, 113t, thus making it difficult to detect such a defect at the initial stage.

Figure 20:
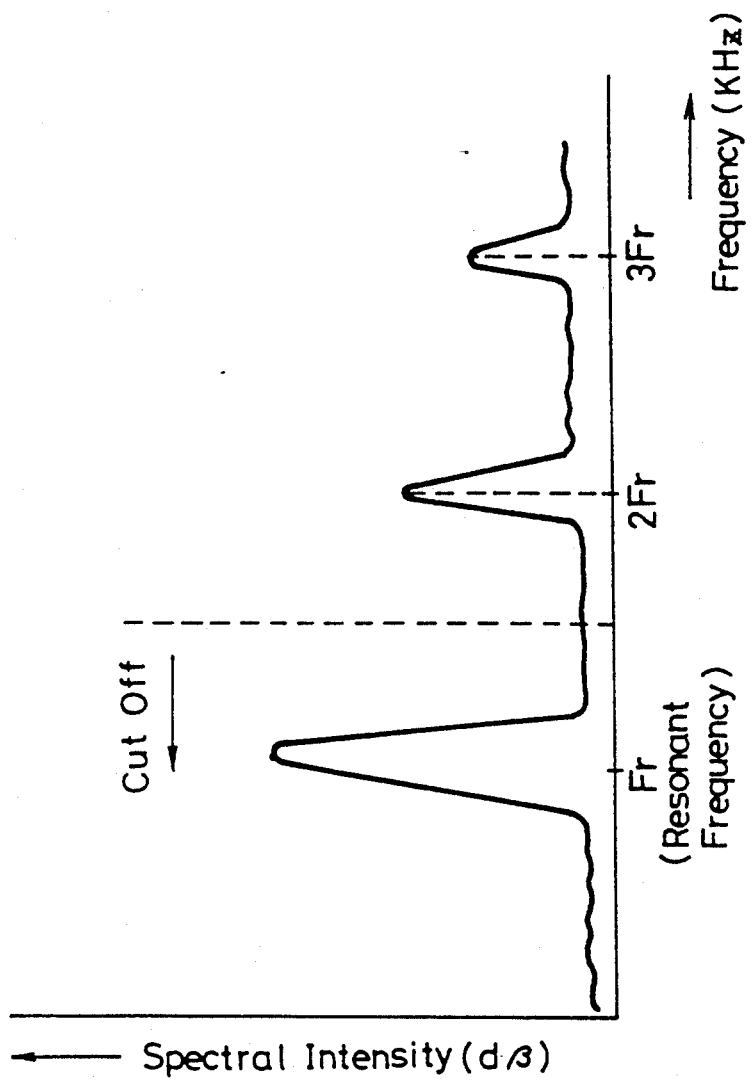
FIG. 20 is a graph showing spectral components of a drive voltage applied to the tape guide device.

While current control is being effected on the tape guide devices, in the event that the ultrasonic vibrators 113s, 113t are detached from the guides 114s, 114t or a defect such as a crack is developed in the surfaces of the ultrasonic vibrators 113s, 113t, the ultrasonic vibrators 113s, 113t are subjected to high-order vibrations, with a resultant distortion in the voltage waveform of the drive signal. FIG. 20 is a graph showing spectral components of the drive voltage applied to the tape guide device, the graph having a vertical axis representing the spectral intensities (dB) and a horizontal axis representing the frequencies (KHz). Review of FIG. 20 reveals that there are harmonic components of second order (2Fr) and third order (3Fr) developed at harmonic frequencies higher than the resonant frequency Fr.

The distortion detecting circuits 121s, 121t shown in FIG. 9 are used to cut off the resonant frequency component from the drive signal and detect distortions from the harmonic components for early detection of a failure or defect as described above.

The distortion detecting process will be described below with reference to FIG. 21.

Figure 21:
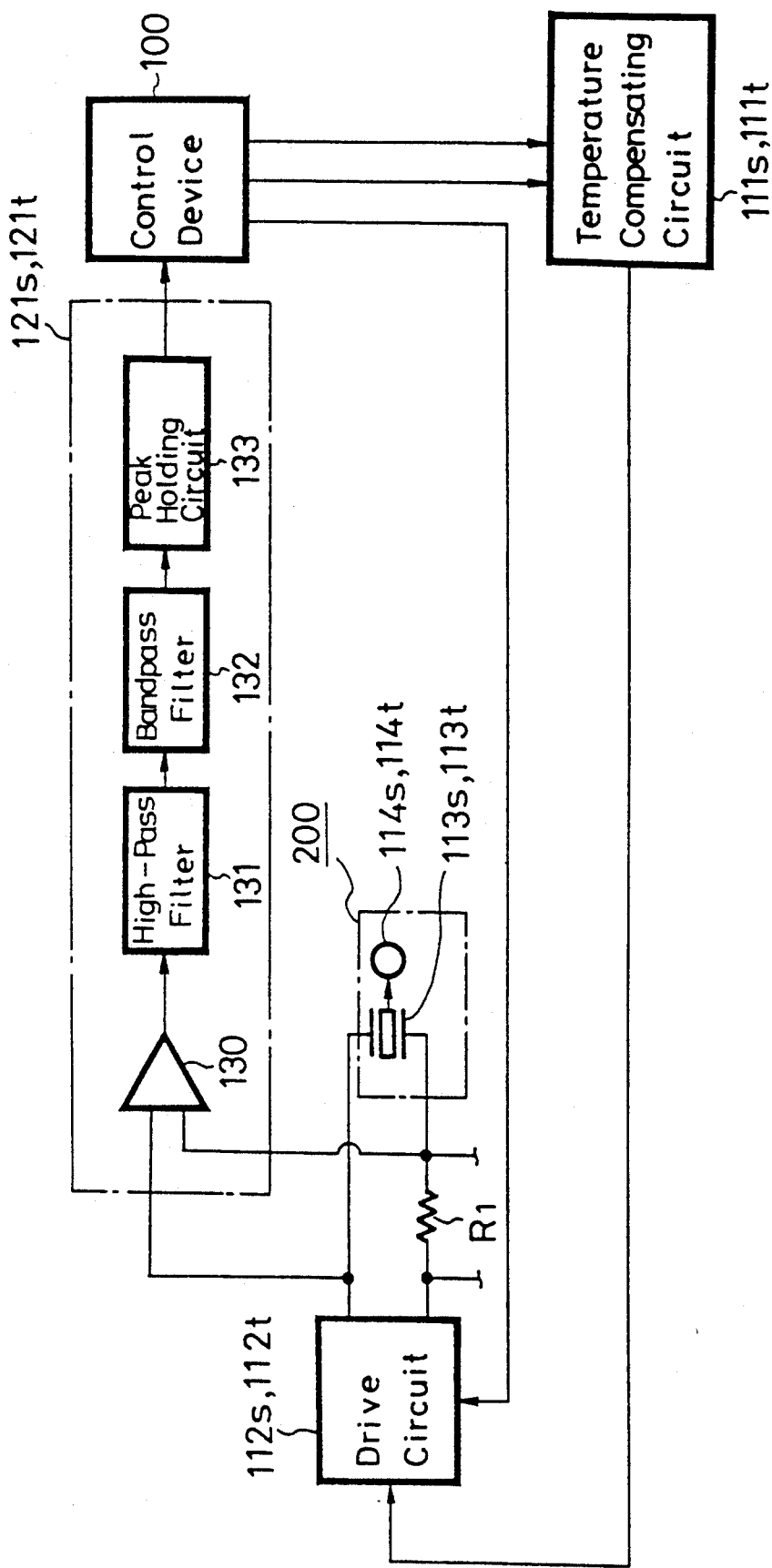
FIG. 21 is a block diagram of a distortion detecting circuit of the tape guide system.

As shown in FIG. 21, the distortion detecting circuit 121s includes an amplifier 130 having an input terminal connected to one of the lines which interconnects the drive circuit 112s and the ultrasonic vibrator 113s and another input terminal connected to the other line which interconnects the drive circuit 112s and the ultrasonic vibrator 113s. The amplifier 130 serves to extract a drive signal from the drive circuit 112s as a voltage signal. The amplifier 130 supplies the voltage signal to a peak holding circuit 133 through a high-pass filter 131 and a band elimination filter 132. When the voltage signal from the amplifier 130 is passed through the high-pass filter 131 and the band elimination filter 132, these filters remove the resonant frequency component from the voltage signal as indicated by the broken line in FIG. 20.

The peak holding circuit 133 converts the voltage signal, from which the resonant frequency component has been cut off, into a substantially direct voltage signal, which is then supplied to the control device 100. Based on the supplied voltage signal, the control device 100 determines whether the tape guide device 200 suffers a failure or defect. An indicator may be connected to the control device 100, and may indicate a failure or defect message when the control device 100 detects a failure or defect of the tape guide device 200.

As described above, the resonant frequency component is removed from the drive signal, and the signal which represents the peak level, held by the peak holding circuit 133, of the voltage signal from which the resonant frequency component has been removed is checked to determine whether the drive signal contains a harmonic component or not. Therefore, in the event that the ultrasonic vibrators 113s, 113t are detached from the guides 114s, 114t or a defect such as a crack is developed in the surfaces of the ultrasonic vibrators 113s, 113t, such a failure or defect can be detected early.

The detection of the tension of the tape 39 will be described below. The detected tension is effective to detect a failure or indicate of the tape guide devices 200 or to confirm the reduction in the friction between the tape 59 and the guide members 2. The tension of the tape is detected using the angle detectors 116s, 116t and the tension detecting circuits 117s, 117t. The tape tension is detected when the pinch roller 65 and the capstan 46 are spaced from each other, i.e., the tape guide assembly 64 is in a so-called reel mode, that is, the tape is driven only by rotation of the reels. The tape tension may be detected in a self-diagnosis process of the control device 100 each time the power supply of the tape guide system is switched on.

While the tape is running in the reel mode, when the tension of the tape on the side of the supply reel is determined, the tension of the tape on the side of the takeup reel is uniquely determined. For example, when the tape tension on the side of the supply reel is of a certain fixed value while the tape is running in a forward direction, the tape tension on the side of the takeup reel is of a value representing the sum of frictions caused by the tape guides between the angle detectors 116s, 116t and the rotary head drum 52 (see FIG. 9). Since the friction applied by a rotary tape guide is very small, an increase in the tape tension while the tape is running in the forward direction is largely affected by the tape guide devices 200 themselves.

The detection of the tape tension will be described in detail with reference to FIG. 22.

Figure 22:
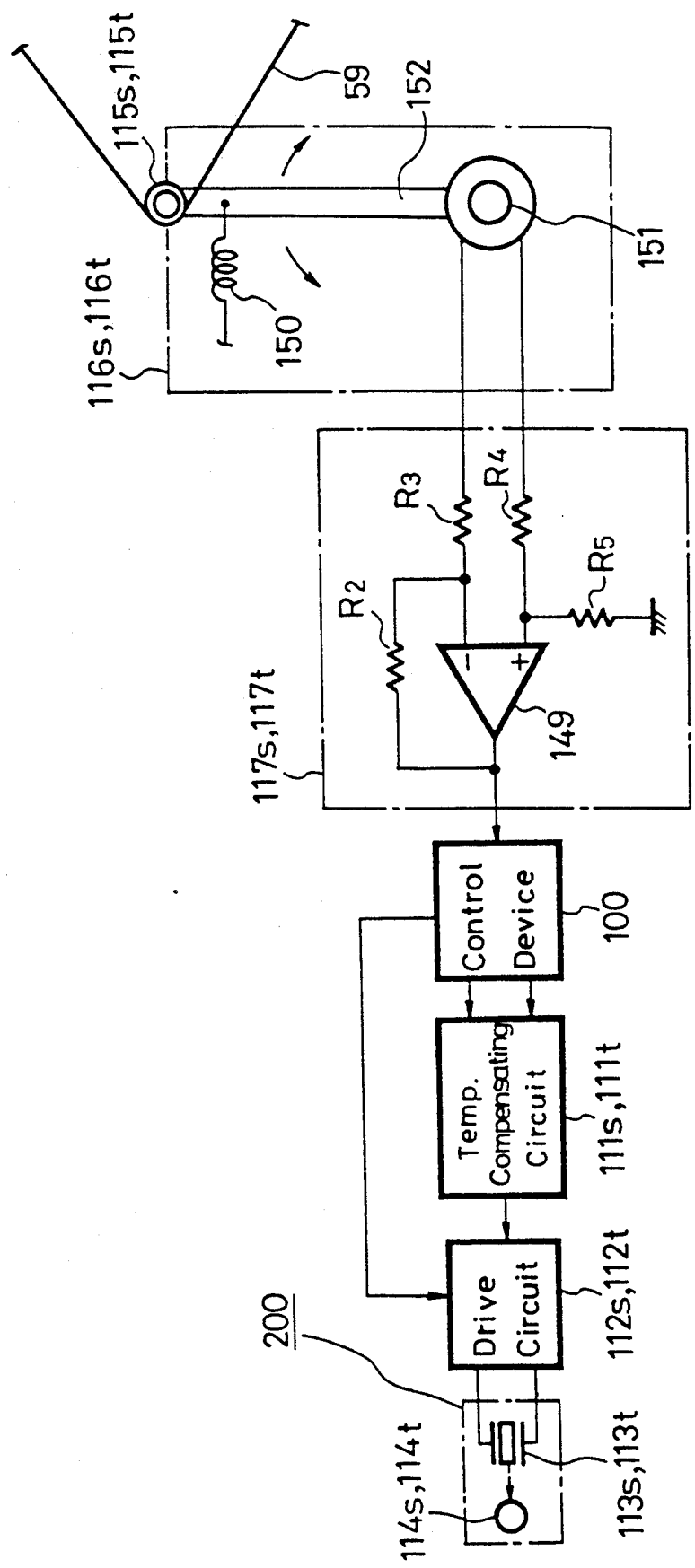
FIG. 22 is a block diagram of a tension detecting circuit and an angle detector of the tape guide system.

In FIG. 22, a magnetic sensor 151 is positioned at the axis of rotation of an arm 152, and connected by the arm 152 to the movable guide 115s. A spring 150 is attached to the arm 152 near the movable guide 115s.

The magnetic sensor 151 has a terminal connected to an inverting input terminal (−) of an operational amplifier 149 through a resistor R3, and another terminal connected to a noninverting input terminal (+) of the operational amplifier 149 through a resistor R4. The inverting input terminal (−) of the operational amplifier 149 is connected to the output terminal thereof through a resistor R2. The noninverting input terminal (+) of the operational amplifier 149 is grounded through a resistor R5. The operational amplifier 149 and the resistors R2~R5 thus connected serve as the tension detecting circuit 117s in the form of a differential amplifier.

Figure 23:
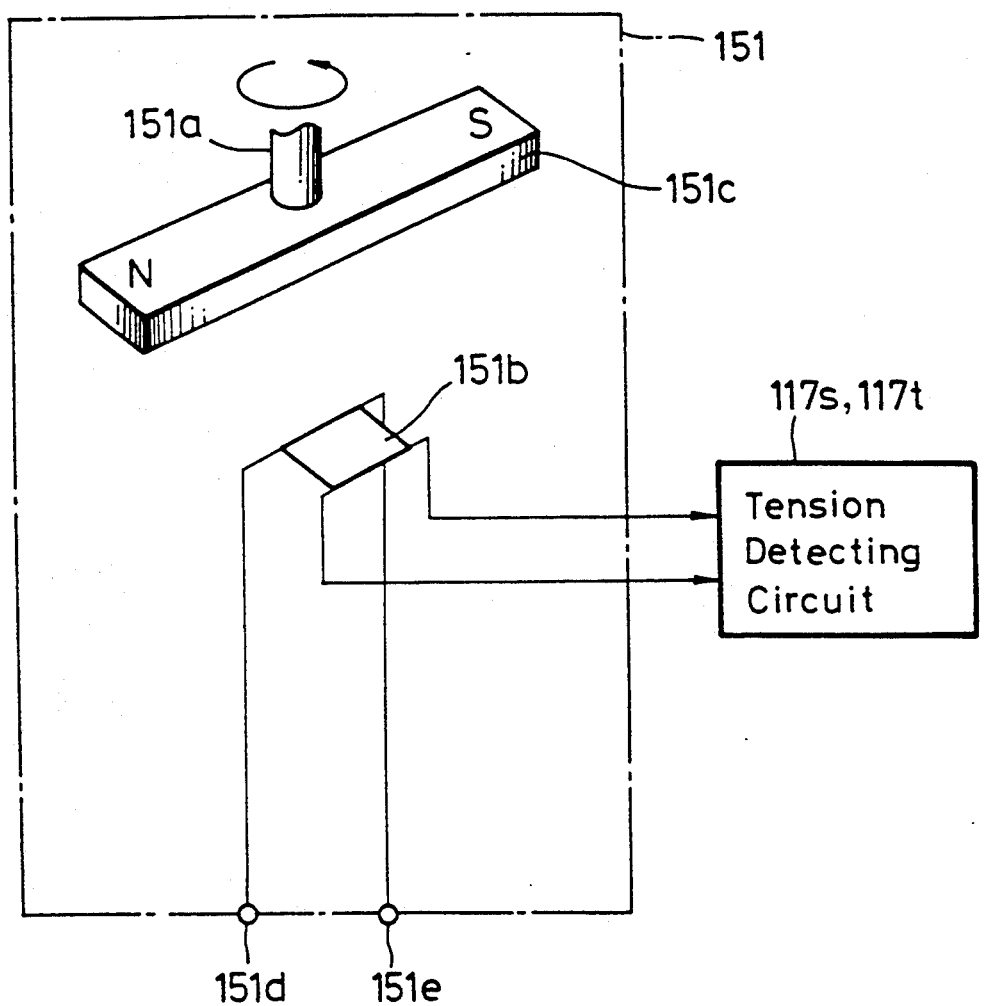
FIG. 23 is a diagram of a magnetic sensor of the angle detector.

As shown in FIG. 23, the magnetic sensor 151 comprises a shaft 151a coupled to the arm 152, a magnet 151c coupled to the shaft 151a, a magnetic sensor element 151b spaced from the magnet 151c and connected to the tension detecting circuit 117s, and a pair of power supply terminals 151d, 151e connected to the magnetic sensor element 151b. When the magnet 151c is rotated by the shaft 151a, the magnetic sensor element 151b generates an angle information signal which is supplied to the tension detecting circuit 117s.

When the tension of the tape 59 varies, the movable guide 115s moves in one of the directions indicated by the arrows in FIG. 22, and the arm 152 is turned about the magnetic sensor 151. The magnetic sensor 151 supplies an angle information signal to the tension detecting circuit 117s, which converts the supplied angle information signal into a tension information signal that is supplied to the control device 100. Similarly, a tension information signal indicating the tape tension on the side of the takeup reel is supplied from the angle detector 116t and the tension detecting circuit 117t to the control device 100.

From the tension information signals supplied from the sides of the supply and takeup reels, the control device 100 calculates a tension ratio between the tape tensions on the sides of the supply and takeup reels. Based on the tension ratio, the control device 100 can recognize the operating conditions of the tape guide devices 200, for the control device 100 can determine whether there is a failure or defect in the tape guide devices 200 or it can confirm that the desired reduction in the friction is being obtained.

FIG. 24 shows the tension ratios between the tape tensions on the sides of the supply and takeup reels, the tension ratios being plotted while the tape 59 is running in the reverse and forward directions in the reel mode. The lefthand graph of FIG. 24 shows the tension ratios plotted when the tape 59 travels in the reverse direction, and the righthand graph of FIG. 24 shows the tension ratios plotted when the tape 59 travels in the forward direction. Each of the graphs has a vertical axis representing the tension ratios and a horizontal axis representing the speeds of travel of the tape 59. In each graph, the broken-line curve is plotted when the tape guide devices 200 is driven, and the solid-line curve is plotted when the tape guide devices 200 are not driven.

The control device 100 determines a failure when the tension ratio is 3.0 or higher. It will be seen from FIG. 24 that when the tape guide devices 200 are driven, the tension ratio does not reach 3.0 or higher at any tape speed and is considerably lower than when the tape guide devices 200 are not driven.

As described above, the tape tensions on the sides of the supply and takeup reels are determined by the angle detectors 116s, 116t and the tension detecting circuits 117s, 117t, and the control device 100 calculates the tension ratio between the determined tape tensions and diagnoses the tape guide devices 200 for a failure or defect. Accordingly, the tape guide devices 200 can easily be checked for a failure or defect and the reduction in the friction caused by the tape guide devices 200 can also easily be confirmed. If the reduction in the friction caused by the tape guide devices 200 is not well achieved, then the tape guide devices 200 may be controlled to substantially eliminate a slack of the tape 59 when the tape 59 is stopped from the running state, and to allow the tape 59 to start running smoothly when the tape 59 starts to run from the stopped state.

Figure 10:
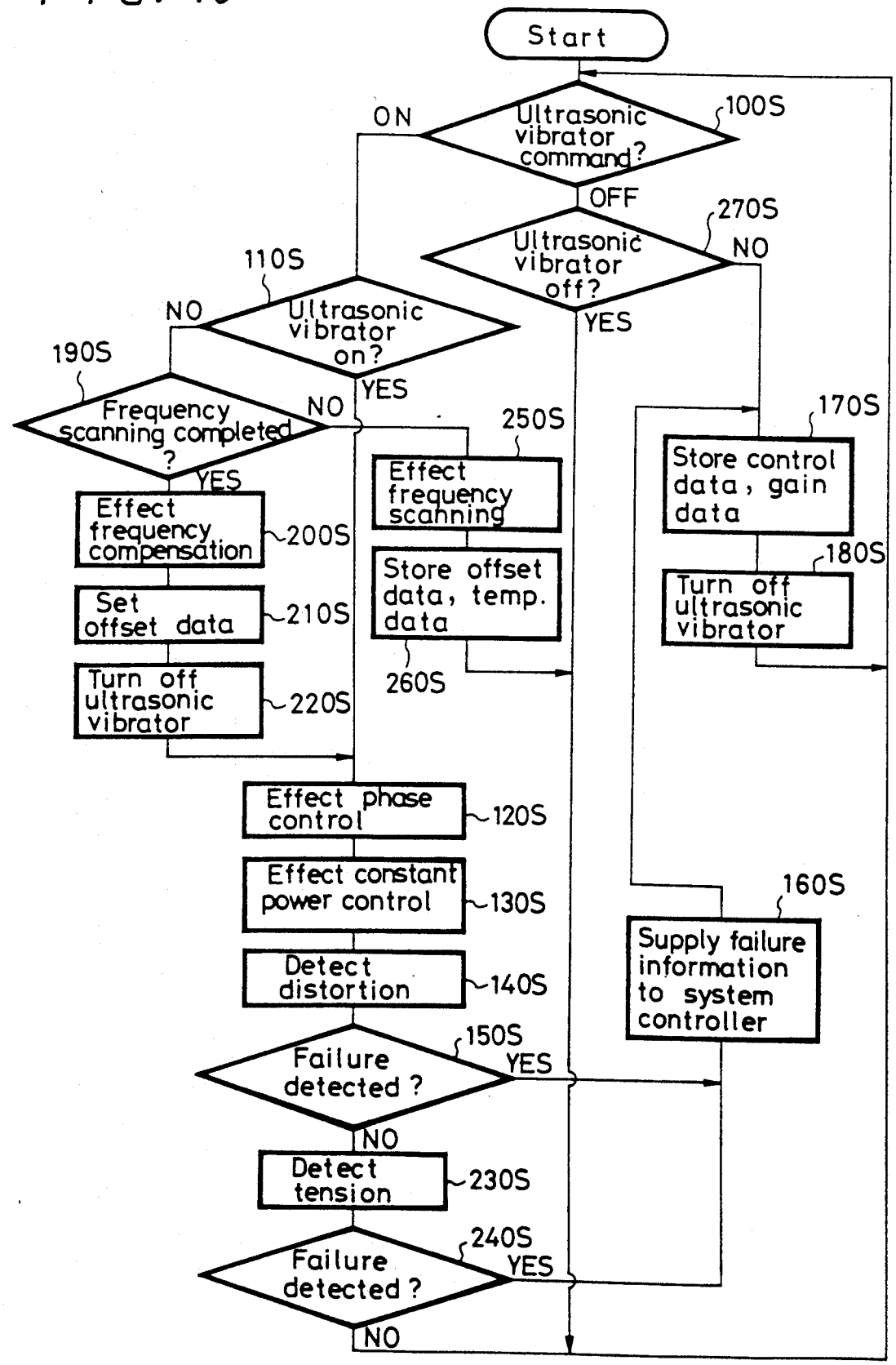
FIG. 10 is a flowchart of an operation sequence of the tape guide system shown in FIG. 9.
Figure 11:
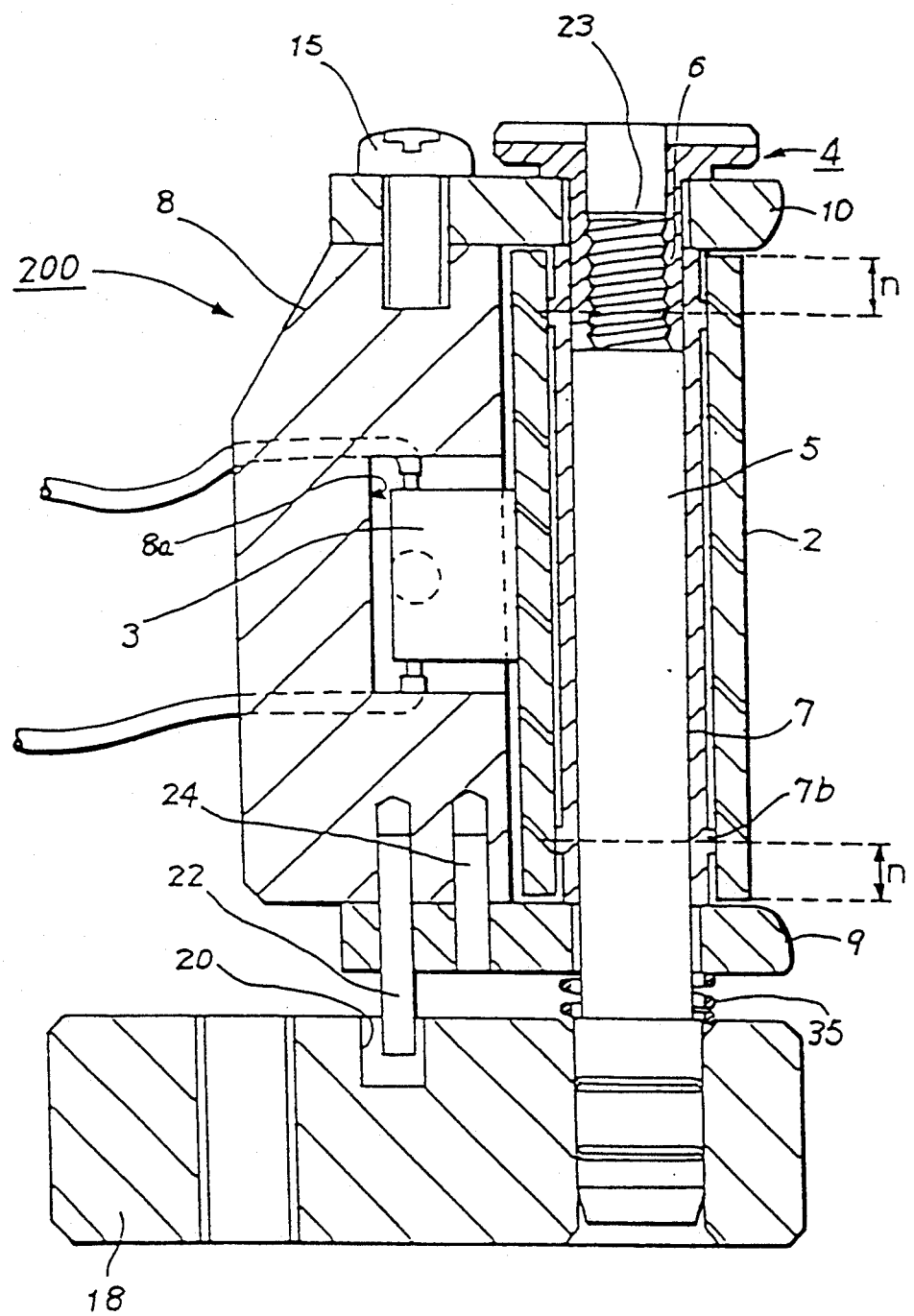
FIG. 11 is an enlarged cross-sectional view of a tape guide device of the tape guide system shown in FIG. 6.
Figure 12:
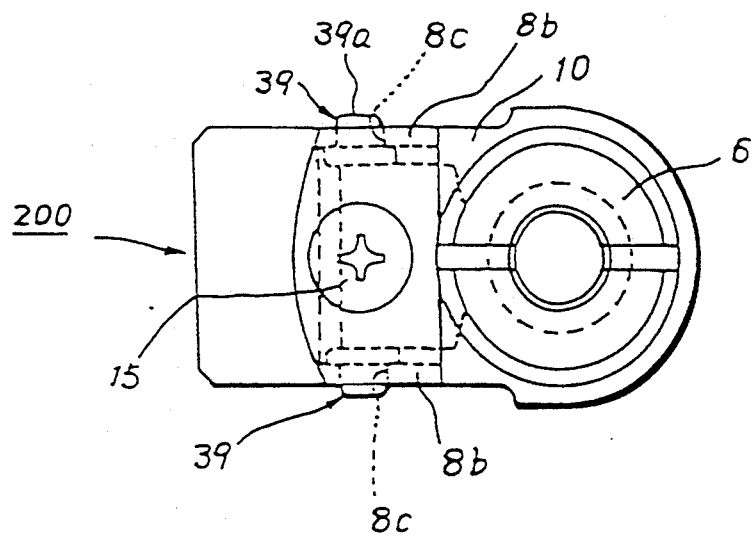
FIG. 12 is a plan view of the tape guide device shown in FIG. 11.

Operation of the overall tape guide system will be described below with reference to FIG. 10.

In a step 100S, the system controller 106 (FIG. 9) checks a command for the ultrasonic vibrators 113s, 113t. If the command is "ON", then control goes to a step 110S, and if the command is "OFF", then control goes to a step 270S.

The step 110S determines whether the ultrasonic vibrators 113s, 113t are turned on or not. If they are turned on (YES), then control goes to a step 120S, and if they are turned off (NO), then control goes to a step 190S.

In the step 120S, the phase detecting circuits 119s, 119t effect the phase control process as described above with reference to FIG. 16. Thereafter, control proceeds to a step 130S.

In the step 130S, the drive circuits 112s, 112t effect the constant power control process as described above with reference to FIG. 19. Thereafter, control proceeds to a step 140S.

In the step 140S, the distortion detecting circuits 121s, 121t detect a distortion as described above with reference to FIG. 21. Then, control goes to a step 150S.

The step 150S determines whether a failure or defect is detected or not. If a failure or defect is detected (YES), then control goes to a step 160S, and if no failure or defect is detected (NO), then control goes to a step 230S.

In the step 160S, failure information is supplied to the system controller 106. The system controller 106 enables an indicator, for example, connected thereto to display a message indicative of the failure or defect that has been detected. Thereafter, control goes to a step 170S.

In the step 170, the control data and the gain data are stored in the RAM 105 (FIG. 9). Thereafter, control goes to a step 180S.

In the step 180S, the ultrasonic vibrators 113s, 113t are turned off.

In the step 230S which follows the step 150S when no failure or defect is detected, the tension of the tape is detected by the tension detecting circuits 117s, 117t as described above with reference to FIG. 22 and the angle detectors 116s, 116t as described above with reference to FIG. 23. Thereafter, control goes to a step 240S.

The step 240 determines whether a failure or defect is detected or not. If a failure or defect is detected (YES), then control goes to the step 160S, and if no failure or defect is detected (NO), then control goes back to the step 100S.

If the ultrasonic vibrators 113s, 113t are not turned on in the step 110S (NO), control goes to a step 190S.

The step 190S determines whether the frequency scanning process has already been finished or not. If the frequency scanning process has already been finished (YES), then control goes to a step 200S, and if not (NO), then control goes to a step 250S.

The step 200S effects frequency compensation, and is followed by a step 210S.

In the step 210S, the offset data are reset. Control then goes to a step 220S.

In the step 220S, ultrasonic vibrators 113s, 113t are turned off. Then, control goes to the step 120S.

In the step 250S, frequency scanning process is carried out by the phase detecting circuits 119s, 119t, the temperature sensor 110, and the temperature compensating circuits 111s, 111t as described above with reference to FIGS. 16 and 9. Thereafter, control proceeds to a step 260S.

In the step 260S, the offset data, the temperature data, etc. are stored in the RAM 105. Control now returns to the step 100S.

The step 270S, which is followed if the command for the ultrasonic vibrators 113s, 113t is "OFF" in the step 100S, determines whether the ultrasonic vibrators 113s, 113t are turned off or not. If they are turned off (YES), then control goes back to the step 100S, and if they are turned on (NO), then control goes to the step 170S.

With the tape guide system, as described above, the control data is varied depending on the temperature at the time of the frequency scanning process for determining an offset value, or the temperature at the time of the frequency scanning process as well as the offset value is stored by the control device, and in the subsequent phase control process, the difference between the temperature data at the time of such subsequent phase control process and the stored temperature data is calculated and the offset data is compensated for based on the calculated difference, for thereby effecting temperature compensation at the time the phase control process is carried out. Therefore, the phase control process can well be carried out immediately at any temperatures.

Having described preferred embodiments of the invention with reference to the accompanying drawings, it is to be understood that the invention is not limited to that precise embodiments and those various changes and modifications could be effected therein by one skilled in the art without departing from the spirit or scope of the invention as defined in the appended claims.

What is claimed is:

1. An apparatus for recording and/or reproducing signals on a tape, said apparatus comprising:

tape supply means and tape take-up means with a tape extending therebetween;

tape drive means for longitudinally transporting said tape between said supply means and take-up means;

head means engageable with said tape between said supply means and take-up means while the tape is being transported for recording and/or reproducing signals on the tape;

guiding means for guiding the tape between said supply means and take-up means including at least one guide element with a predetermined resonant frequency and having a surface slidably engageable by the tape for guiding the latter, and ultrasonic oscillation generating means connected with said guide element and being operable for effecting ultrasonic vibration of the guide element so as to reduce frictional resistance to movement of the tape across said surface of the guide element;

drive circuit means for supplying an ultrasonic sine-wave drive signal to said oscillation generating means for operating the latter;

control means for determining the frequency of said ultrasonic sine-wave drive signal to correspond to said resonant frequency;

temperature sensing means for sensing a change in the temperature of said guide element and to which said control means responds; and temperature compensating means controlled by said control means for changing the frequency of said ultrasonic sine-wave drive signal so as to correspond with any change in said resonant frequency of said guide element resulting from a sensed temperature change.

2. The apparatus according to claim 1; in which said control means is programmed to initially scan the frequency of said ultrasonic sine-wave drive signal and determines said resonant frequency as the scanned frequency which corresponds to the maximum amplitude of said drive signal.

3. The apparatus according to claim 1; in which said drive circuit means includes a voltage-controlled oscillator providing an oscillation output at a frequency determined by a frequency control voltage, and gain control means acting on said oscillation output for determining the amplitude of said ultrasonic sine-wave drive signal produced therefrom in accordance with a gain control signal; and in which said control means determines said frequency control voltage so that said voltage-controlled oscillator provides said oscillation output at said resonant frequency.

4. The apparatus according to claim 1; further comprising means for detecting distortion of said drive signal as an indication of abnormal operation of said guiding means.

5. The apparatus according to claim 4; in which said drive signal normally has said resonant frequency, and in which said means for detecting distortion includes means for providing a voltage signal corresponding to said drive signal, filter means for eliminating from said voltage signal a component in a band containing said resonant frequency, and means for detecting an output of said filter means as an indication of said abnormal operation.

6. The apparatus according to claim 1; in which said one guide element engages the tape between said supply means and a location along the tape where the latter is engageable by said head means; and in which said guiding means further includes a second guide element having a surface slidably engageable by the tape between said location along the latter and said take-up means, and second ultrasonic oscillation generating means connected with said second guide element and being operable for effecting ultrasonic vibration of said second guide element.

7. The apparatus according to claim 6; in which each of said guide elements has a standing wave oscillation generated therein by the respective oscillation generating means and is fixedly supported at nodes of said standing wave.

8. The apparatus according to claim 6; further comprising first and second means for detecting tensions in said tape between said one guide element and said supply means and between said second guide element and said take-up means, respectively; and in which said control means responds to abnormal differences between the tensions detected by said first and second means as an indication of defective operation of said guiding means.

* * * * *